(12) United States Patent
Jhang et al.

(10) Patent No.: US 11,640,045 B2
(45) Date of Patent: May 2, 2023

(54) OPTICAL IMAGING LENS

(71) Applicant: Genius Electronic Optical (Xiamen) Co., Ltd., Fujian (CN)

(72) Inventors: Jia-Sin Jhang, Taichung (TW); Maozong Lin, Fujian (CN); Zhao Wang, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 302 days.

(21) Appl. No.: 17/019,370

(22) Filed: Sep. 14, 2020

(65) Prior Publication Data
US 2022/0035130 A1 Feb. 3, 2022

(30) Foreign Application Priority Data
Jul. 30, 2020 (CN) .......................... 202010749336.3

(51) Int. Cl.
| | |
|---|---|
| G02B 9/60 | (2006.01) |
| G02B 13/00 | (2006.01) |
| G02B 13/02 | (2006.01) |
| G02B 27/00 | (2006.01) |
| H04N 23/55 | (2023.01) |

(52) U.S. Cl.
CPC ........... *G02B 9/60* (2013.01); *G02B 13/0045* (2013.01); *G02B 13/02* (2013.01); *G02B 27/0025* (2013.01); *H04N 23/55* (2023.01)

(58) Field of Classification Search
None
See application file for complete search history.

(56) References Cited

U.S. PATENT DOCUMENTS

| | | | | |
|---|---|---|---|---|
| 8,649,113 | B1* | 2/2014 | Tsai | G02B 13/0045 359/740 |
| 9,411,134 | B1* | 8/2016 | Chen | G02B 13/0045 |
| 10,379,322 | B2 | 8/2019 | Wu | |
| 2015/0160434 | A1* | 6/2015 | Chen | H04N 5/2252 359/740 |
| 2016/0091691 | A1* | 3/2016 | Son | G02B 9/60 359/764 |
| 2018/0335612 | A1* | 11/2018 | Chen | G02B 13/0045 |

FOREIGN PATENT DOCUMENTS

| | | |
|---|---|---|
| CN | 108957708 A | 12/2018 |
| CN | 110471169 A | 11/2019 |
| CN | 110488465 A | 11/2019 |
| CN | 110488466 A | 11/2019 |
| CN | 111025531 A | 4/2020 |

* cited by examiner

*Primary Examiner* — Darryl J Collins
(74) *Attorney, Agent, or Firm* — Winston Hsu

(57) ABSTRACT

An optical imaging lens includes a first lens element to a fifth lens element from an object side to an image side in order along an optical axis. The first lens element has positive refracting power and a periphery region of the image-side surface of the first lens element is concave, a periphery region of the object-side surface of the second lens element is convex, a periphery region of the object-side surface of the third lens element is convex, the fifth lens element has negative refracting power and optical axis region of the object-side surface of the fifth lens element is concave to satisfy (G12+G23+G34)/(G45+T5)≥2.500 and EFL*Fno/HFOV≥3.500 mm/degree.

20 Claims, 28 Drawing Sheets

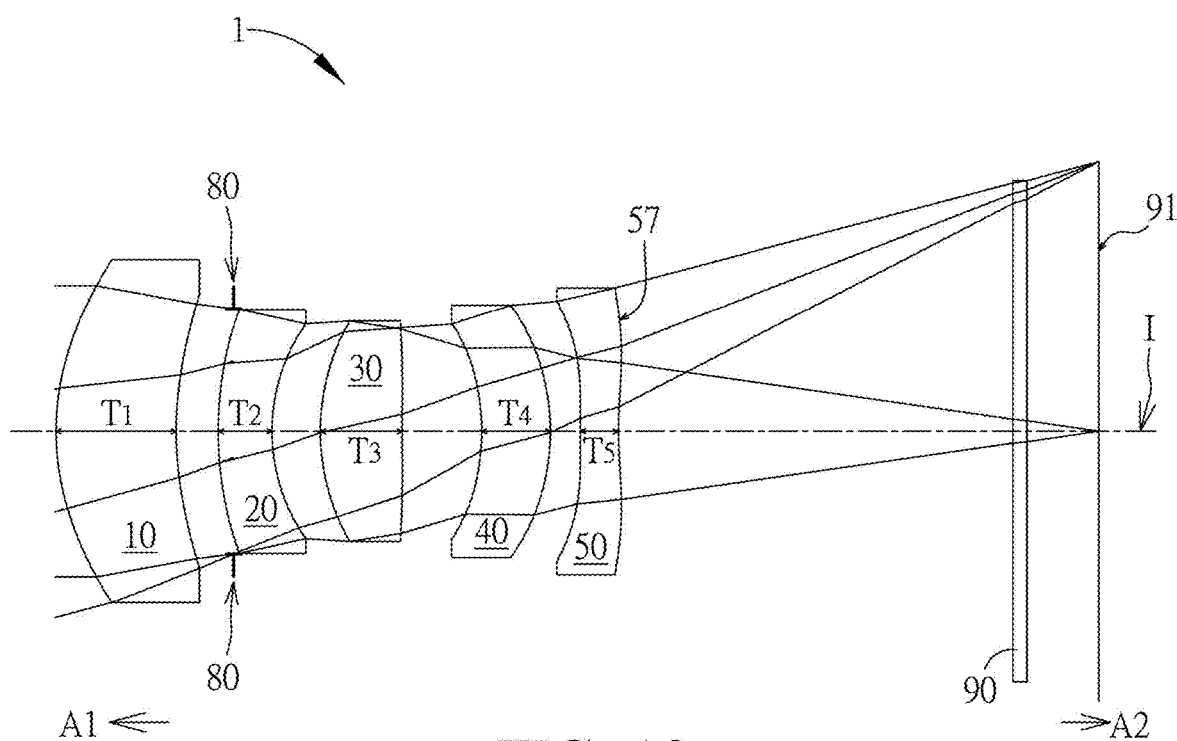
FIG. 10
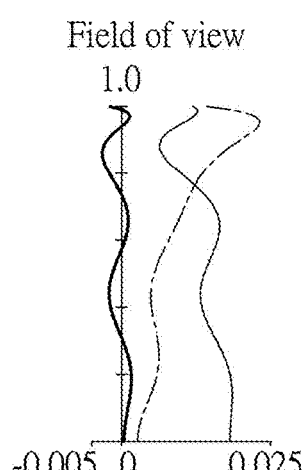
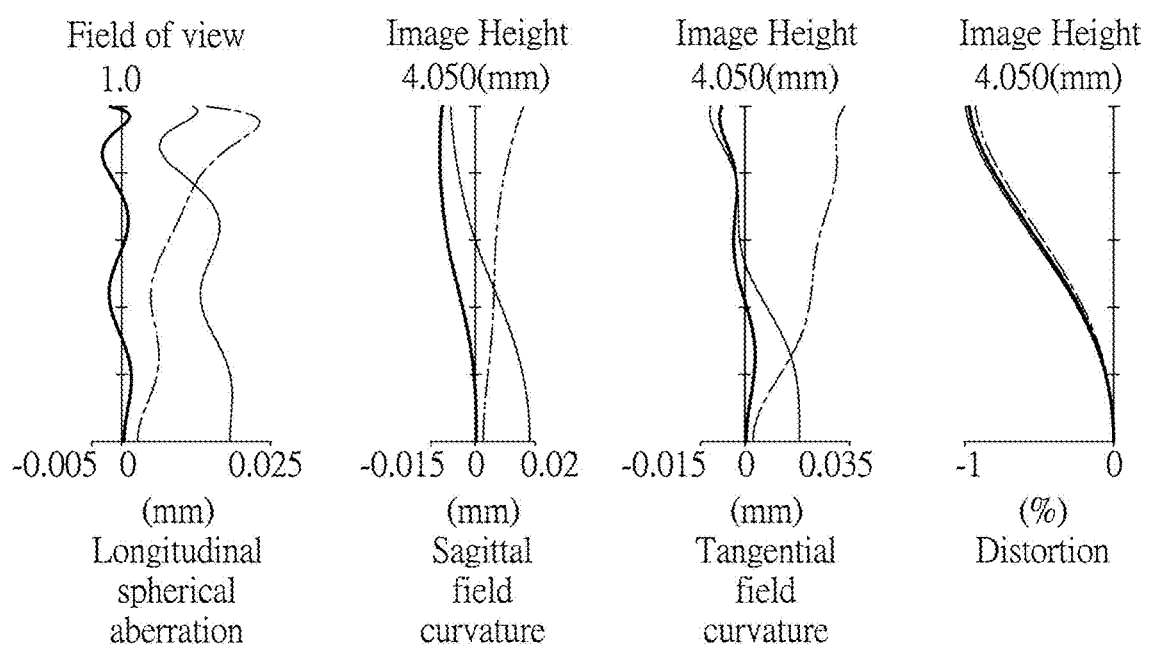
FIG. 11A   FIG. 11B   FIG. 11C   FIG. 11D

| First Embodiment | | | | | | | |
|---|---|---|---|---|---|---|---|
| EFL=14.741mm, HFOV=14.740 Degrees, TTL=13.428mm, Fno=3.500, ImgH=4.050mm | | | | | | | |
| No. | | Radius (mm) | Aperture Stop Distance/ Lens Thickness/ Air Gap (mm) | Refractive Index | Abbe No. | Material | Focal length (mm) |
| | Object | INFINITY | INFINITY | | | | |
| 11 | First Lens | 3.906 | 1.138 | T1 | 1.535 | 55.690 | Plastic | 8.768 |
| 12 | | 20.578 | 0.078 | G12 | | | | |
| 80 | Ape. Stop | INFINITY | 0.329 | | | | |
| 21 | Second Lens | 9.304 | 0.516 | T2 | 1.642 | 22.409 | Plastic | -11.263 |
| 22 | | 3.999 | 0.455 | G23 | | | | |
| 31 | Third Lens | 4.804 | 1.588 | T3 | 1.535 | 55.690 | Plastic | 10.989 |
| 32 | | 22.847 | 1.187 | G34 | | | | |
| 41 | Fourth Lens | -4.269 | 1.087 | T4 | 1.642 | 22.409 | Plastic | 23.317 |
| 42 | | -3.661 | 0.050 | G45 | | | | |
| 51 | Fifth Lens | -15.698 | 0.769 | T5 | 1.535 | 55.690 | Plastic | -7.582 |
| 52 | | 5.593 | 3.500 | G5F | | | | |
| 90 | Filter | INFINITY | 0.210 | | 1.517 | 64.167 | | |
| | | INFINITY | 2.521 | | | | | |
| 91 | Image Plane | INFINITY | | | | | | |

FIG. 22

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.516462E-03 | -5.908035E-03 | -7.286288E-03 | -7.918376E-03 | -2.823352E-03 |
| $a_6$ | -2.442458E-04 | 1.932016E-03 | 6.028500E-03 | 6.491120E-03 | 1.777982E-03 |
| $a_8$ | 3.185622E-06 | -5.441346E-04 | -1.802721E-03 | -1.574176E-03 | 2.479087E-04 |
| $a_{10}$ | -1.025362E-05 | 8.169086E-05 | 2.783900E-04 | 2.000567E-04 | -6.402397E-05 |
| $a_{12}$ | 1.814942E-06 | -3.706342E-06 | -1.861815E-05 | -1.797393E-05 | 1.998289E-06 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -3.011480E-03 | 3.964327E-03 | -1.636366E-03 | -5.331208E-02 | -4.291700E-02 |
| $a_6$ | -1.234474E-03 | -9.050134E-03 | -4.278136E-03 | 8.597872E-03 | 1.313487E-02 |
| $a_8$ | 4.980562E-04 | 2.511037E-03 | 3.773945E-03 | 2.997927E-03 | -3.091724E-03 |
| $a_{10}$ | -8.978935E-05 | -8.974907E-04 | -2.016700E-03 | -2.625866E-03 | 5.086276E-04 |
| $a_{12}$ | 1.704930E-06 | 7.696104E-05 | 4.706170E-04 | 7.017529E-04 | -4.862015E-05 |
| $a_{14}$ | 0.000000E+00 | 0.000000E+00 | -3.939445E-05 | -6.434764E-05 | 1.959697E-06 |

FIG. 23

| Second Embodiment ||||||||
|---|---|---|---|---|---|---|---|
| EFL=16.543mm, HFOV=13.699 Degrees, TTL=16.266mm, Fno=3.500, ImgH=4.050mm ||||||||
| No. | | Radius (mm) | Aperture Stop Distance/ Lens Thickness/ Air Gap (mm) | | Refractive Index | Abbe No. | Material | Focal length (mm) |
| | Object | INFINITY | INFINITY | | | | | |
| 11 | First Lens | 3.676 | 1.054 | T1 | 1.535 | 55.690 | Plastic | 13.173 |
| 12 | | 6.886 | 1.859 | G12 | | | | |
| 80 | Ape. Stop | INFINITY | -0.276 | | | | | |
| 21 | Second Lens | 6.224 | 0.464 | T2 | 1.642 | 22.409 | Plastic | -8.787 |
| 22 | | 2.885 | 0.421 | G23 | | | | |
| 31 | Third Lens | 2.773 | 1.150 | T3 | 1.535 | 55.690 | Plastic | 8.497 |
| 32 | | 6.044 | 1.364 | G34 | | | | |
| 41 | Fourth Lens | -2.670 | 0.691 | T4 | 1.642 | 22.409 | Plastic | 26.515 |
| 42 | | -2.545 | 0.301 | G45 | | | | |
| 51 | Fifth Lens | -2.742 | 0.427 | T5 | 1.535 | 55.690 | Plastic | -20.073 |
| 52 | | -3.877 | 5.000 | G5F | | | | |
| 90 | Filter | INFINITY | 0.210 | | 1.517 | 64.167 | | |
| | | INFINITY | 3.601 | | | | | |
| 91 | Image Plane | INFINITY | | | | | | |

FIG. 24

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.463949E-03 | -2.322824E-03 | -6.130577E-03 | -1.583559E-02 | -1.418334E-02 |
| $a_6$ | -1.502547E-04 | -2.890675E-04 | 2.866000E-03 | 7.420495E-03 | 3.627611E-03 |
| $a_8$ | -1.875118E-05 | 5.045192E-05 | -2.452653E-04 | -9.252840E-04 | 7.538044E-06 |
| $a_{10}$ | 3.098441E-06 | 2.811995E-06 | -9.644210E-07 | 2.189060E-04 | -8.185166E-05 |
| $a_{12}$ | 4.907480E-10 | -3.416175E-07 | -4.417279E-06 | -6.031724E-05 | 1.505708E-05 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -6.406120E-03 | -1.148706E-03 | -2.128305E-03 | -3.932570E-02 | -2.792498E-02 |
| $a_6$ | 4.182815E-04 | 1.607239E-03 | 8.002749E-03 | 1.937576E-02 | 8.962656E-03 |
| $a_8$ | -2.964254E-04 | -2.117294E-03 | -3.994454E-03 | -1.048816E-02 | -4.156915E-03 |
| $a_{10}$ | -3.207045E-05 | -4.266986E-05 | 6.211545E-04 | 3.084244E-03 | 1.252386E-03 |
| $a_{12}$ | 1.808335E-05 | -2.749656E-05 | -3.713746E-06 | -4.117690E-04 | -1.944284E-04 |
| $a_{14}$ | 0.000000E+00 | 0.000000E+00 | -6.470804E-06 | 1.864731E-05 | 1.244783E-05 |

FIG. 25

| No. | | Radius (mm) | Aperture Stop Distance/ Lens Thickness/ Air Gap (mm) | | Refractive Index | Abbe No. | Material | Focal length (mm) |
|---|---|---|---|---|---|---|---|---|
| Third Embodiment | | | | | | | | |
| EFL=15.315mm, HFOV=14.952 Degrees, TTL=15.645mm, Fno=3.500, ImgH=4.050mm | | | | | | | | |
| | Object | INFINITY | INFINITY | | | | | |
| 11 | First Lens | 3.931 | 1.808 | T1 | 1.535 | 55.690 | Plastic | 19.105 |
| 12 | | 5.347 | 0.859 | G12 | | | | |
| 80 | Ape. Stop | INFINITY | -0.230 | | | | | |
| 21 | Second Lens | 5.428 | 0.805 | T2 | 1.642 | 22.409 | Plastic | -9.796 |
| 22 | | 2.754 | 0.723 | G23 | | | | |
| 31 | Third Lens | 3.173 | 1.227 | T3 | 1.535 | 55.690 | Plastic | 6.083 |
| 32 | | 95.172 | 1.198 | G34 | | | | |
| 41 | Fourth Lens | -3.441 | 1.028 | T4 | 1.642 | 22.409 | Plastic | 30.787 |
| 42 | | -3.279 | 0.453 | G45 | | | | |
| 51 | Fifth Lens | -3024.559 | 0.567 | T5 | 1.535 | 55.690 | Plastic | -11.735 |
| 52 | | 6.316 | 5.910 | G5F | | | | |
| 90 | Filter | INFINITY | 0.210 | | 1.517 | 64.167 | | |
| | | INFINITY | 1.088 | | | | | |
| 91 | Image Plane | INFINITY | | | | | | |

FIG. 26

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.825043E-03 | -5.199723E-03 | -6.589983E-03 | -1.303590E-02 | -9.695464E-03 |
| $a_6$ | -1.270527E-04 | 1.254938E-03 | 5.215269E-03 | 8.611135E-03 | 2.807743E-03 |
| $a_8$ | 3.336503E-06 | -3.621279E-04 | -1.439764E-03 | -1.730939E-03 | -5.535203E-05 |
| $a_{10}$ | -4.838502E-06 | 2.118372E-05 | 1.274849E-04 | -1.251891E-04 | -4.274353E-05 |
| $a_{12}$ | 5.511552E-07 | 3.959489E-06 | 3.731560E-06 | 5.039080E-05 | 1.674294E-06 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -7.416444E-03 | 3.486334E-03 | 8.071682E-03 | -4.297406E-02 | -4.757198E-02 |
| $a_6$ | -8.406314E-04 | -7.648249E-03 | -5.754208E-03 | 4.582473E-03 | 1.175851E-02 |
| $a_8$ | 6.509571E-04 | 2.485915E-03 | 2.463913E-03 | 1.716195E-03 | -2.177778E-03 |
| $a_{10}$ | -7.098887E-05 | -6.758571E-04 | -7.257220E-04 | -9.825161E-04 | 2.625925E-04 |
| $a_{12}$ | -8.310237E-06 | 6.384810E-05 | 1.144866E-04 | 2.047877E-04 | -1.410296E-05 |
| $a_{14}$ | 0.000000E+00 | 0.000000E+00 | -6.853962E-06 | -1.571280E-05 | 2.015207E-08 |

FIG. 27

| Fourth Embodiment |||||||
|---|---|---|---|---|---|---|
| EFL=14.871mm, HFOV=14.867 Degrees, TTL=13.825mm, Fno=3.500, ImgH=4.050mm |||||||
| No. | | Radius (mm) | Aperture Stop Distance/ Lens Thickness/ Air Gap (mm) | Refractive Index | Abbe No. | Material | Focal length (mm) |
| | Object | INFINITY | INFINITY | | | | |
| 11 | First Lens | 3.827 | 1.496 | T1 | 1.535 | 55.690 | Plastic | 9.261 |
| 12 | | 14.323 | 0.116 | G12 | | | |
| 80 | Ape. Stop | INFINITY | 0.423 | | | | |
| 21 | Second Lens | 9.462 | 0.837 | T2 | 1.642 | 22.409 | Plastic | -8.777 |
| 22 | | 3.427 | 0.598 | G23 | | | |
| 31 | Third Lens | 3.959 | 0.858 | T3 | 1.535 | 55.690 | Plastic | 9.180 |
| 32 | | 18.564 | 1.253 | G34 | | | |
| 41 | Fourth Lens | -5.165 | 1.154 | T4 | 1.642 | 22.409 | Plastic | 15.434 |
| 42 | | -3.704 | 0.107 | G45 | | | |
| 51 | Fifth Lens | -13.857 | 0.817 | T5 | 1.535 | 55.690 | Plastic | -7.380 |
| 52 | | 5.666 | 5.000 | G5F | | | |
| 90 | Filter | INFINITY | 0.210 | | 1.517 | 64.167 | |
| | | INFINITY | 0.955 | | | | |
| 91 | Image Plane | INFINITY | | | | | |

FIG. 28

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.550693E-03 | -5.467096E-03 | -9.762691E-03 | -1.576547E-02 | -1.273495E-02 |
| $a_6$ | -1.311034E-04 | 1.867135E-03 | 6.674682E-03 | 1.060742E-02 | 3.916523E-03 |
| $a_8$ | 1.753153E-06 | -5.093649E-04 | -1.914809E-03 | -2.580735E-03 | 5.755673E-05 |
| $a_{10}$ | -6.365115E-06 | 6.651334E-05 | 2.786076E-04 | 2.655602E-04 | -1.502506E-04 |
| $a_{12}$ | 6.930472E-07 | -2.692457E-06 | -1.555751E-05 | -5.769118E-06 | 1.222442E-05 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -6.781545E-03 | 7.026411E-03 | 1.400700E-02 | -3.281618E-02 | -4.112185E-02 |
| $a_6$ | -1.067214E-03 | -8.047131E-03 | -1.580797E-02 | -8.290745E-03 | 1.076287E-02 |
| $a_8$ | 9.904679E-04 | 2.373687E-03 | 9.140134E-03 | 1.037229E-02 | -2.086621E-03 |
| $a_{10}$ | -2.948283E-04 | -7.455854E-04 | -3.283048E-03 | -4.229188E-03 | 2.755989E-04 |
| $a_{12}$ | 1.918203E-05 | 5.913407E-05 | 6.050145E-04 | 8.390812E-04 | -1.967580E-05 |
| $a_{14}$ | 0.000000E+00 | 0.000000E+00 | -4.372839E-05 | -6.454399E-05 | 4.877865E-07 |

FIG. 29

| Fifth Embodiment ||||||||
|---|---|---|---|---|---|---|---|
| EFL=18.886mm, HFOV=11.860 Degrees, TTL=16.097mm, Fno=3.500, ImgH=4.050mm ||||||||
| No. | | Radius (mm) | Aperture Stop Distance/ Lens Thickness/ Air Gap (mm) | | Refractive Index | Abbe No. | Material | Focal length (mm) |
| | Object | INFINITY | INFINITY | | | | | |
| 11 | First Lens | 3.835 | 1.380 | T1 | 1.535 | 55.690 | Plastic | 8.417 |
| 12 | | 22.092 | 0.399 | G12 | | | | |
| 80 | Ape. Stop | INFINITY | 0.193 | | | | | |
| 21 | Second Lens | 9.211 | 0.604 | T2 | 1.642 | 22.409 | Plastic | -8.677 |
| 22 | | 3.399 | 0.471 | G23 | | | | |
| 31 | Third Lens | 3.881 | 0.405 | T3 | 1.535 | 55.690 | Plastic | 23.818 |
| 32 | | 5.368 | 2.469 | G34 | | | | |
| 41 | Fourth Lens | -6.445 | 0.541 | T4 | 1.642 | 22.409 | Plastic | 13.834 |
| 42 | | -3.871 | 0.225 | G45 | | | | |
| 51 | Fifth Lens | -183.873 | 0.390 | T5 | 1.535 | 55.690 | Plastic | -10.053 |
| 52 | | 5.567 | 5.910 | G5F | | | | |
| 90 | Filter | INFINITY | 0.210 | | 1.517 | 64.167 | | |
| | | INFINITY | 2.900 | | | | | |
| 91 | Image Plane | INFINITY | | | | | | |

FIG. 30

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -7.975982E-04 | -2.574554E-03 | -8.213480E-03 | -1.318728E-02 | -9.609564E-03 |
| $a_6$ | -1.751650E-04 | 1.178938E-05 | 3.725954E-03 | 6.663508E-03 | 5.472047E-04 |
| $a_8$ | -5.537955E-06 | 2.793651E-05 | -6.079523E-04 | -7.689278E-04 | 8.084884E-04 |
| $a_{10}$ | -1.646351E-06 | -2.619081E-06 | 6.279241E-05 | 5.353906E-05 | -1.908628E-04 |
| $a_{12}$ | 1.186393E-07 | 9.836117E-08 | -3.086680E-06 | 1.695924E-06 | 1.543572E-05 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.422952E-03 | 9.997842E-03 | 1.904998E-02 | -4.018743E-02 | -5.364280E-02 |
| $a_6$ | -2.198457E-03 | -9.161823E-03 | -1.807265E-02 | -2.819345E-03 | 1.506588E-02 |
| $a_8$ | 9.209201E-04 | 1.638008E-03 | 7.335767E-03 | 7.702751E-03 | -2.412793E-03 |
| $a_{10}$ | -1.849295E-04 | -2.497700E-04 | -1.983748E-03 | -2.923114E-03 | 1.319164E-04 |
| $a_{12}$ | 1.057937E-05 | -2.952304E-05 | 2.647402E-04 | 5.088833E-04 | 1.728453E-05 |
| $a_{14}$ | 0.000000E+00 | 0.000000E+00 | -1.533769E-05 | -3.425786E-05 | -2.138920E-06 |

FIG. 31

| Sixth Embodiment ||||||||
|---|---|---|---|---|---|---|---|
| EFL=15.602mm, HFOV=14.170 Degrees, TTL=14.350mm, Fno=3.500, ImgH=4.050mm ||||||||
| No. | | Radius (mm) | Aperture Stop Distance/ Lens Thickness/ Air Gap (mm) | | Refractive Index | Abbe No. | Material | Focal length (mm) |
| | Object | INFINITY | INFINITY | | | | | |
| 11 | First Lens | 3.715 | 1.267 | T1 | 1.535 | 55.690 | Plastic | 9.466 |
| 12 | | 12.147 | 0.154 | G12 | | | | |
| 80 | Ape. Stop | INFINITY | 0.448 | | | | | |
| 21 | Second Lens | 9.687 | 0.529 | T2 | 1.642 | 22.409 | Plastic | -10.216 |
| 22 | | 3.846 | 0.507 | G23 | | | | |
| 31 | Third Lens | 4.617 | 1.848 | T3 | 1.535 | 55.690 | Plastic | 11.995 |
| 32 | | 14.014 | 1.098 | G34 | | | | |
| 41 | Fourth Lens | -5.273 | 1.092 | T4 | 1.642 | 22.409 | Plastic | 19.110 |
| 42 | | -3.998 | 0.174 | G45 | | | | |
| 51 | Fifth Lens | -28.324 | 0.702 | T5 | 1.535 | 55.690 | Plastic | -8.858 |
| 52 | | 5.767 | 5.910 | G5F | | | | |
| 90 | Filter | INFINITY | 0.210 | | 1.517 | 64.167 | | |
| | | INFINITY | 0.411 | | | | | |
| 91 | Image Plane | INFINITY | | | | | | |

FIG. 32

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.257245E-03 | -3.300839E-03 | -8.104003E-03 | -1.302526E-02 | -8.640784E-03 |
| $a_6$ | -1.712168E-04 | 2.953952E-04 | 3.912804E-03 | 5.624062E-03 | 9.957848E-04 |
| $a_8$ | -5.451642E-08 | -7.592515E-05 | -6.207888E-04 | -5.473678E-04 | 4.343483E-04 |
| $a_{10}$ | -6.277070E-06 | 1.281775E-05 | 5.745184E-05 | 5.650454E-05 | -6.772646E-05 |
| $a_{12}$ | 7.319138E-07 | -3.720958E-07 | -2.801930E-06 | -1.140597E-05 | -1.101451E-06 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -3.449570E-03 | 7.570569E-03 | 1.184866E-02 | -3.690858E-02 | -4.297816E-02 |
| $a_6$ | -2.148910E-03 | -8.677834E-03 | -1.234793E-02 | -3.012104E-03 | 1.105324E-02 |
| $a_8$ | 7.041315E-04 | 2.281653E-03 | 6.019930E-03 | 6.206935E-03 | -2.103701E-03 |
| $a_{10}$ | -1.402385E-04 | -6.069523E-04 | -1.956172E-03 | -2.513160E-03 | 2.707685E-04 |
| $a_{12}$ | 4.182385E-06 | 4.178729E-05 | 3.342093E-04 | 4.832953E-04 | -1.845660E-05 |
| $a_{14}$ | 0.000000E+00 | 0.000000E+00 | -2.251131E-05 | -3.575163E-05 | 4.087003E-07 |

FIG. 33

| Seventh Embodiment | | | | | | | |
|---|---|---|---|---|---|---|---|
| EFL=18.403mm, HFOV=12.403 Degrees, TTL=17.134mm, Fno=3.500, ImgH=4.050mm | | | | | | | |
| No. | | Radius (mm) | Aperture Stop Distance/ Lens Thickness/ Air Gap (mm) | Refractive Index | Abbe No. | Material | Focal length (mm) |
| | Object | INFINITY | INFINITY | | | | |
| 11 | First Lens | 3.664 | 1.659 | T1 | 1.535 | 55.690 | Plastic | 6.724 |
| 12 | | -212.392 | -0.019 | G12 | | | |
| 80 | Ape. Stop | INFINITY | 0.438 | | | | |
| 21 | Second Lens | 121.738 | 0.683 | T2 | 1.642 | 22.409 | Plastic | -10.530 |
| 22 | | 6.441 | 0.633 | G23 | | | |
| 31 | Third Lens | -891.370 | 1.013 | T3 | 1.535 | 55.690 | Plastic | -22.494 |
| 32 | | 12.252 | 1.100 | G34 | | | |
| 41 | Fourth Lens | -4.477 | 0.968 | T4 | 1.642 | 22.409 | Plastic | 42.724 |
| 42 | | -4.181 | 0.062 | G45 | | | |
| 51 | Fifth Lens | -6274.840 | 0.537 | T5 | 1.535 | 55.690 | Plastic | -73.407 |
| 52 | | 39.676 | 5.910 | G5F | | | |
| 90 | Filter | INFINITY | 0.210 | | 1.517 | 64.167 | |
| | | INFINITY | 3.941 | | | | |
| 91 | Image Plane | INFINITY | | | | | |

FIG. 34

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -4.940914E-04 | -4.044431E-03 | -9.378365E-03 | -1.345737E-02 | -1.366087E-02 |
| $a_6$ | -2.415593E-04 | 1.099576E-03 | 5.589029E-03 | 8.245904E-03 | 5.729695E-03 |
| $a_8$ | 6.548138E-05 | -3.219520E-04 | -1.546340E-03 | -2.163526E-03 | -1.571713E-03 |
| $a_{10}$ | -2.149860E-05 | 5.451136E-05 | 2.793512E-04 | 3.391066E-04 | 2.543640E-04 |
| $a_{12}$ | 1.886009E-06 | -2.693491E-06 | -2.022126E-05 | -1.217819E-05 | 2.252307E-06 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.697286E-03 | 1.095201E-02 | 1.051136E-02 | -3.539276E-02 | -3.703313E-02 |
| $a_6$ | 6.877781E-04 | -9.881996E-03 | -8.407916E-03 | 1.617325E-03 | 7.638088E-03 |
| $a_8$ | -1.059456E-03 | 1.207534E-03 | 3.455339E-03 | 2.852771E-03 | -1.329731E-03 |
| $a_{10}$ | 1.927385E-04 | -3.547847E-04 | -1.030692E-03 | -1.104531E-03 | 1.683369E-04 |
| $a_{12}$ | -8.247521E-06 | -1.650920E-05 | 1.462480E-04 | 1.612755E-04 | -1.784731E-05 |
| $a_{14}$ | 0.000000E+00 | 0.000000E+00 | -7.246537E-06 | -8.278086E-06 | 1.004738E-06 |

FIG. 35

| Eighth Embodiment ||||||||
|---|---|---|---|---|---|---|---|
| EFL=15.329mm, HFOV=14.733 Degrees, TTL=14.389mm, Fno=3.500, ImgH=4.050mm ||||||||
| No. | | Radius (mm) | Aperture Stop Distance/ Lens Thickness/ Air Gap (mm) | | Refractive Index | Abbe No. | Material | Focal length (mm) |
| | Object | INFINITY | INFINITY | | | | | |
| 11 | First Lens | 3.865 | 1.621 | T1 | 1.535 | 55.690 | Plastic | 12.283 |
| 12 | | 7.966 | 0.468 | G12 | | | | |
| 80 | Ape. Stop | INFINITY | 0.025 | | | | | |
| 21 | Second Lens | -138.510 | 0.572 | T2 | 1.642 | 22.409 | Plastic | -13.861 |
| 22 | | 9.610 | 0.648 | G23 | | | | |
| 31 | Third Lens | 4.841 | 0.857 | T3 | 1.535 | 55.690 | Plastic | 10.033 |
| 32 | | 44.702 | 1.264 | G34 | | | | |
| 41 | Fourth Lens | -3090.276 | 1.206 | T4 | 1.642 | 22.409 | Plastic | -4933.638 |
| 42 | | -95482.479 | 0.413 | G45 | | | | |
| 51 | Fifth Lens | -10.355 | 0.548 | T5 | 1.535 | 55.690 | Plastic | -12.465 |
| 52 | | 19.291 | 5.910 | G5F | | | | |
| 90 | Filter | INFINITY | 0.210 | | 1.517 | 64.167 | | |
| | | INFINITY | 0.646 | | | | | |
| 91 | Image Plane | INFINITY | | | | | | |

FIG. 36

| No. | 11 | 12 | 21 | 22 | 31 |
|---|---|---|---|---|---|
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.187036E-03 | -3.304109E-03 | -8.799543E-03 | -1.389864E-02 | -7.219152E-03 |
| $a_6$ | -7.111871E-05 | 7.809144E-04 | 4.877700E-03 | 5.834713E-03 | -1.086048E-03 |
| $a_8$ | -3.855977E-05 | -4.783100E-04 | -1.052666E-03 | -5.061427E-04 | 1.487386E-03 |
| $a_{10}$ | 1.623015E-06 | 1.115829E-04 | 1.609947E-04 | -4.762166E-06 | -3.622735E-04 |
| $a_{12}$ | 6.231700E-08 | -8.084728E-06 | -1.166223E-05 | 2.669726E-06 | 3.240209E-05 |
| $a_{14}$ | 0.000000E+00 | 0.000000E+00 | 0.000000E+00 | 0.000000E+00 | 0.000000E+00 |
| No. | 32 | 41 | 42 | 51 | 52 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 9.960170E-04 | 5.075331E-03 | 5.541165E-03 | -4.316358E-02 | -3.868241E-02 |
| $a_6$ | -5.304466E-03 | -7.016170E-03 | -6.854421E-03 | 9.245291E-04 | 6.608696E-03 |
| $a_8$ | 1.981528E-03 | 1.843814E-03 | 2.324148E-03 | 3.343105E-03 | 2.221013E-04 |
| $a_{10}$ | -4.422921E-04 | -5.556529E-04 | -5.234544E-04 | -9.459959E-04 | -3.227978E-04 |
| $a_{12}$ | 4.138759E-05 | 4.333191E-05 | 4.179624E-05 | 1.241388E-04 | 6.406511E-05 |
| $a_{14}$ | 0.000000E+00 | 0.000000E+00 | -1.977895E-06 | -1.090590E-05 | -4.428984E-06 |

FIG. 37

| Embodiment | 1st | 2nd | 3rd | 4th | 5th | 6th | 7th | 8th |
|---|---|---|---|---|---|---|---|---|
| T1 | 1.138 | 1.054 | 1.808 | 1.496 | 1.380 | 1.267 | 1.659 | 1.621 |
| G12 | 0.406 | 1.583 | 0.629 | 0.539 | 0.591 | 0.602 | 0.419 | 0.493 |
| T2 | 0.516 | 0.464 | 0.805 | 0.837 | 0.604 | 0.529 | 0.683 | 0.572 |
| G23 | 0.455 | 0.421 | 0.723 | 0.598 | 0.471 | 0.507 | 0.633 | 0.648 |
| T3 | 1.588 | 1.150 | 1.227 | 0.858 | 0.405 | 1.848 | 1.013 | 0.857 |
| G34 | 1.187 | 1.364 | 1.198 | 1.253 | 2.469 | 1.098 | 1.100 | 1.264 |
| T4 | 1.087 | 0.691 | 1.028 | 1.154 | 0.541 | 1.092 | 0.968 | 1.206 |
| G45 | 0.050 | 0.301 | 0.453 | 0.107 | 0.225 | 0.174 | 0.062 | 0.413 |
| T5 | 0.769 | 0.427 | 0.567 | 0.817 | 0.390 | 0.702 | 0.537 | 0.548 |
| G5F | 3.500 | 5.000 | 5.910 | 5.000 | 5.910 | 5.910 | 5.910 | 5.910 |
| TF | 0.210 | 0.210 | 0.210 | 0.210 | 0.210 | 0.210 | 0.210 | 0.210 |
| GFP | 2.521 | 3.601 | 1.088 | 0.955 | 2.900 | 0.411 | 3.941 | 0.646 |
| BFL | 6.231 | 8.811 | 7.208 | 6.165 | 9.020 | 6.531 | 10.061 | 6.766 |
| EFL | 14.741 | 16.543 | 15.315 | 14.871 | 18.886 | 15.602 | 18.403 | 15.329 |
| TL | 7.197 | 7.455 | 8.437 | 7.660 | 7.077 | 7.819 | 7.073 | 7.623 |
| TTL | 13.428 | 16.266 | 15.645 | 13.825 | 16.097 | 14.350 | 17.134 | 14.389 |
| ALT | 5.099 | 3.785 | 5.435 | 5.163 | 3.321 | 5.438 | 4.859 | 4.805 |
| AAG | 2.099 | 3.670 | 3.002 | 2.497 | 3.757 | 2.381 | 2.214 | 2.818 |
| Fno | 3.500 | 3.500 | 3.500 | 3.500 | 3.500 | 3.500 | 3.500 | 3.500 |
| HFOV | 14.740 | 13.699 | 14.952 | 14.867 | 11.860 | 14.170 | 12.403 | 14.731 |

FIG. 38

| Embodiment | 1st | 2nd | 3rd | 4th | 5th | 6th | 7th | 8th |
|---|---|---|---|---|---|---|---|---|
| EFL*Fno/HFOV | 3.500 | 4.227 | 3.585 | 3.501 | 5.573 | 3.854 | 5.193 | 3.642 |
| (G12+G23+G34)/(G45+T5) | 2.501 | 4.629 | 2.501 | 2.585 | 5.739 | 2.517 | 3.593 | 2.501 |
| EFL/AAG | 7.023 | 4.508 | 5.102 | 5.955 | 5.027 | 6.553 | 8.313 | 5.439 |
| (T5+BFL)/T1 | 6.150 | 8.765 | 4.301 | 4.666 | 6.818 | 5.707 | 6.389 | 4.511 |
| (T3+G34+T4)/T2 | 7.491 | 6.909 | 4.291 | 3.901 | 5.651 | 7.635 | 4.510 | 5.816 |
| G34/(T2+G23) | 1.223 | 1.541 | 0.784 | 0.873 | 2.295 | 1.060 | 0.836 | 1.036 |
| T1/(T4+G45) | 1.001 | 1.063 | 1.221 | 1.186 | 1.800 | 1.001 | 1.611 | 1.001 |
| ALT/(G12+G34) | 3.199 | 1.284 | 2.975 | 2.881 | 1.085 | 3.199 | 3.199 | 2.735 |
| BFL/AAG | 2.969 | 2.401 | 2.401 | 2.469 | 2.401 | 2.743 | 4.545 | 2.401 |
| EFL/TL | 2.048 | 2.219 | 1.815 | 1.941 | 2.668 | 1.995 | 2.602 | 2.011 |
| TTL/HFOV | 0.911 | 1.187 | 1.046 | 0.930 | 1.357 | 1.013 | 1.381 | 0.977 |
| (T2+G45)/G12 | 1.392 | 0.483 | 1.999 | 1.752 | 1.403 | 1.169 | 1.777 | 1.999 |
| (T2+T3+T4)/T5 | 4.148 | 5.399 | 5.399 | 3.485 | 3.978 | 4.940 | 4.963 | 4.806 |
| ALT/(T1+G34) | 2.192 | 1.565 | 1.808 | 1.878 | 0.863 | 2.299 | 1.762 | 1.665 |
| D35/T2 | 5.999 | 5.999 | 4.033 | 3.981 | 5.999 | 5.798 | 3.903 | 5.999 |
| (EFL+G45)/ALT | 2.901 | 4.450 | 2.901 | 2.901 | 5.755 | 2.901 | 3.800 | 3.276 |
| (T3+G34)/G23 | 6.099 | 5.967 | 3.355 | 3.530 | 6.099 | 5.813 | 3.340 | 3.271 |
| (T4+T5)/T3 | 1.169 | 0.972 | 1.299 | 2.299 | 2.299 | 0.971 | 1.485 | 2.048 |
| T1/G23 | 2.501 | 2.501 | 2.501 | 2.502 | 2.929 | 2.501 | 2.622 | 2.501 |
| AAG/(G12+G45) | 4.599 | 1.948 | 2.776 | 3.864 | 4.599 | 3.068 | 4.599 | 3.110 |
| Largest air gap along the optical axis | G34 | G12 | G34 | G34 | G34 | G34 | G34 | G34 |

FIG. 39

OPTICAL IMAGING LENS

BACKGROUND OF THE INVENTION

1. Field of the Invention

The present invention generally relates to an optical imaging lens. Specifically speaking, the present invention is directed to an optical imaging lens for use in such as a mobile phone, a camera, a tablet personal computer, or a personal digital assistant (PDA) and for taking pictures or for recording videos.

2. Description of the Prior Art

In recent years, an optical imaging lens improves along with its wider and wider applications. In addition to the requirements of a lighter, thinner, shorter and smaller optical imaging lens with improved imaging quality such as better aberration or chromatic aberration, a telephoto function may be added. However, a current optical imaging lens is difficult to balance the requirements of good imaging quality, a lighter, thinner, shorter and smaller volume and a telephoto function.

Taking the practical production problems such as lens material characteristics, fabrication, assembly yield into consideration, the present invention proposes a optical imaging lens which has good optical performance, a reduced system length, is technical possible and has an enhanced telephoto function.

SUMMARY OF THE INVENTION

In the light of the above, various embodiments of the present invention propose an optical imaging lens of five lens elements which has reduced system length of the optical imaging lens, ensured imaging quality, an enhanced telephoto function, good optical performance and is technically possible. The optical imaging lens of five lens elements of the present invention from an object side to an image side in order along an optical axis has a first lens element, a second lens element, a third lens element, a fourth lens element and a fifth lens element. Each of the first lens element, the second lens element, the third lens element, the fourth lens element and the fifth lens element respectively has an object-side surface which faces toward the object side and allows imaging rays to pass through as well as an image-side surface which faces toward the image side and allows the imaging rays to pass through.

In one embodiment, the first lens element has positive refracting power and a periphery region of the image-side surface of the first lens element is concave, a periphery region of the object-side surface of the second lens element is convex, a periphery region of the object-side surface of the third lens element is convex, the fifth lens element has negative refracting power and an optical axis region of the object-side surface of the fifth lens element is concave to satisfy the relationship: $EFL*Fno/HFOV \geq 3.500$ mm/degree and $(G12+G23+G34)/(G45+T5) \geq 2.500$.

In another embodiment, a periphery region of the image-side surface of the first lens element is concave, the second lens element has negative refracting power and a periphery region of the object-side surface of the second lens element is convex, a periphery region of the object-side surface of the third lens element is convex and an optical axis region of the object-side surface of the fifth lens element is concave to satisfy the relationship: $EFL*Fno/HFOV \geq 3.500$ mm/degree and $(G12+G23+G34)/(G45+T5) \geq 2.500$.

In another embodiment, a periphery region of the image-side surface of the first lens element is concave, a periphery region of the object-side surface of the second lens element is convex, an optical axis region of the image-side surface of the third lens element is concave and the fifth lens element has negative refracting power and an optical axis region of the object-side surface of the fifth lens element is concave to satisfy the relationship: $EFL/AAG \geq 4.500$ and the largest air gap along the optical axis is G12 or G34.

In the optical imaging lens of the present invention, the embodiments may also selectively satisfy the following numerical conditions:

1. $TTL/HFOV \geq 0.900$ mm/degree;
2. $(T5+BFL)/T1 \geq 4.300$;
3. $G34/(T2+G23) \leq 2.300$;
4. $T1/(T4+G45) \geq 1.000$;
5. $(T2+G45)/G12 \leq 2.000$;
6. $(T2+T3+T4)/T5 \leq 5.400$;
7. $(EFL+G45)/ALT \geq 2.900$;
8. $(T3+G34)/G23 \leq 6.100$;
9. $(T4+T5)/T3 \leq 2.300$;
10. $T1/G23 \geq 2.500$;
11. $BFL/AAG \geq 2.400$;
12. $AAG/(G12+G45) \leq 4.600$;
13. $(T3+G34+T4)/T2 \geq 3.900$;
14. $ALT/(G12+G34) \leq 3.200$;
15. $EFL/TL \geq 1.800$;
16. $ALT/(T1+G34) \leq 2.300$;
17. $D35/T2 \leq 6.000$.

In order to facilitate clearness of the parameters represented by the present invention and the drawings, it is defined in this specification and the drawings: T1 is a thickness of the first lens element along the optical axis; T2 is a thickness of the second lens element along the optical axis; T3 is a thickness of the third lens element along the optical axis; T4 is a thickness of the fourth lens element along the optical axis; T5 is a thickness of the fifth lens element along the optical axis. G12 is an air gap between the first lens element and the second lens element along the optical axis; G23 is an air gap between the second lens element and the third lens element along the optical axis; G34 is an air gap between the third lens element and the fourth lens element along the optical axis; G45 is an air gap between the fourth lens element and the fifth lens element along the optical axis. ALT is a sum of thicknesses of all the five lens elements along the optical axis. In addition, TL is a distance from the object-side surface of the first lens element to the image-side surface of the fifth lens element along the optical axis; TTL is a distance from the object-side surface of the first lens element to an image plane along the optical axis, and that is the system length of the optical imaging lens; BFL is a distance from the image-side surface of the fifth lens element to the image plane along the optical axis. AAG is a sum of four air gaps from the first lens element to the fifth lens element along the optical axis; EFL is an effective focal length of the optical imaging lens; HFOV stands for the half field of view of the optical imaging lens; D35 is a distance from the image-side surface of the third lens element to the image-side surface of the fifth lens element along the optical axis.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 illustrates a third embodiment of the optical imaging lens of the present invention.

FIG. 11A illustrates the longitudinal spherical aberration on the image plane of the third embodiment.

FIG. 11B illustrates the field curvature aberration on the sagittal direction of the third embodiment.

FIG. 11C illustrates the field curvature aberration on the tangential direction of the third embodiment.

FIG. 11D illustrates the distortion aberration of the third embodiment.

FIG. 22 shows the optical data of the first embodiment of the optical imaging lens.

FIG. 23 shows the aspheric surface data of the first embodiment.

FIG. 24 shows the optical data of the second embodiment of the optical imaging lens.

FIG. 25 shows the aspheric surface data of the second embodiment.

FIG. 26 shows the optical data of the third embodiment of the optical imaging lens.

FIG. 27 shows the aspheric surface data of the third embodiment.

FIG. 28 shows the optical data of the fourth embodiment of the optical imaging lens.

FIG. 29 shows the aspheric surface data of the fourth embodiment.

FIG. 30 shows the optical data of the fifth embodiment of the optical imaging lens.

FIG. 31 shows the aspheric surface data of the fifth embodiment.

FIG. 32 shows the optical data of the sixth embodiment of the optical imaging lens.

FIG. 33 shows the aspheric surface data of the sixth embodiment.

FIG. 34 shows the optical data of the seventh embodiment of the optical imaging lens.

FIG. 35 shows the aspheric surface data of the seventh embodiment.

FIG. 36 shows the optical data of the eighth embodiment of the optical imaging lens.

FIG. 37 shows the aspheric surface data of the eighth embodiment.

FIG. 38 shows some important parameters in the embodiments.

FIG. 39 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

Figure 1:
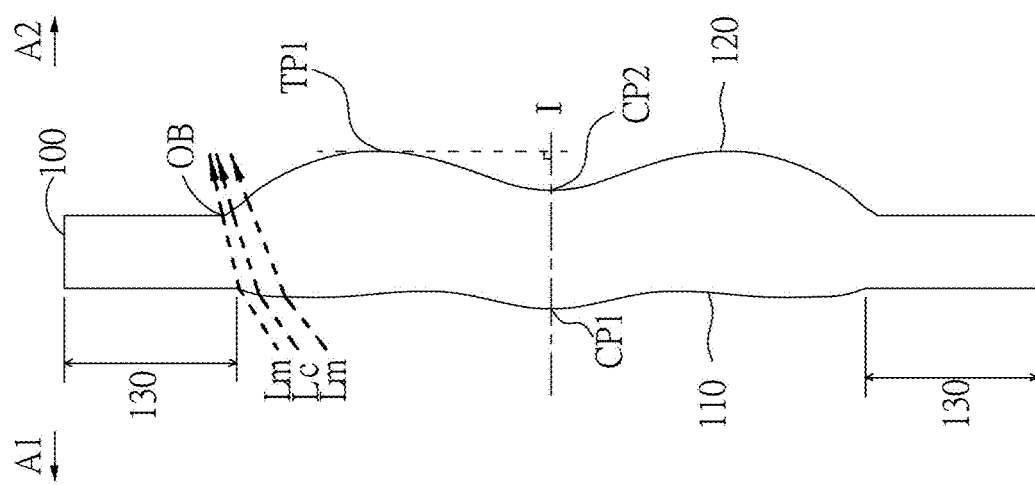

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
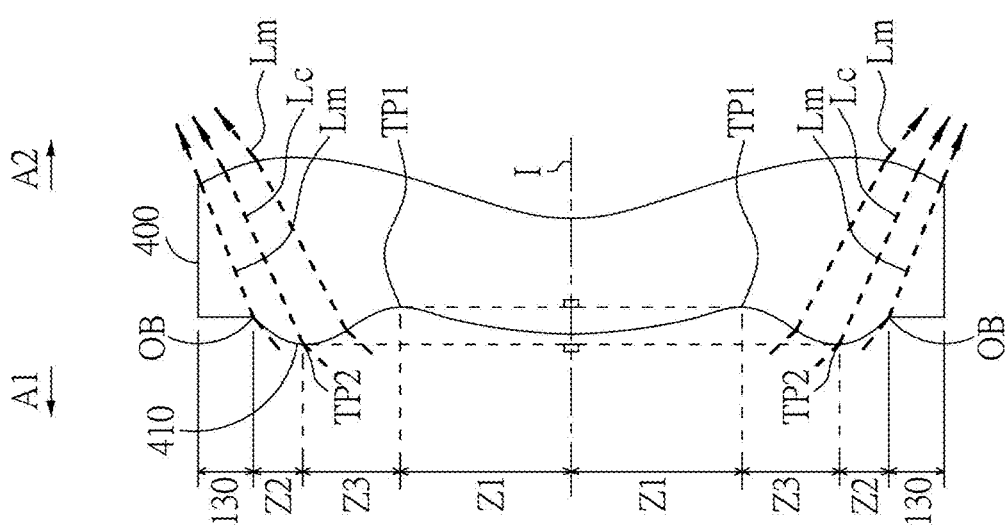

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
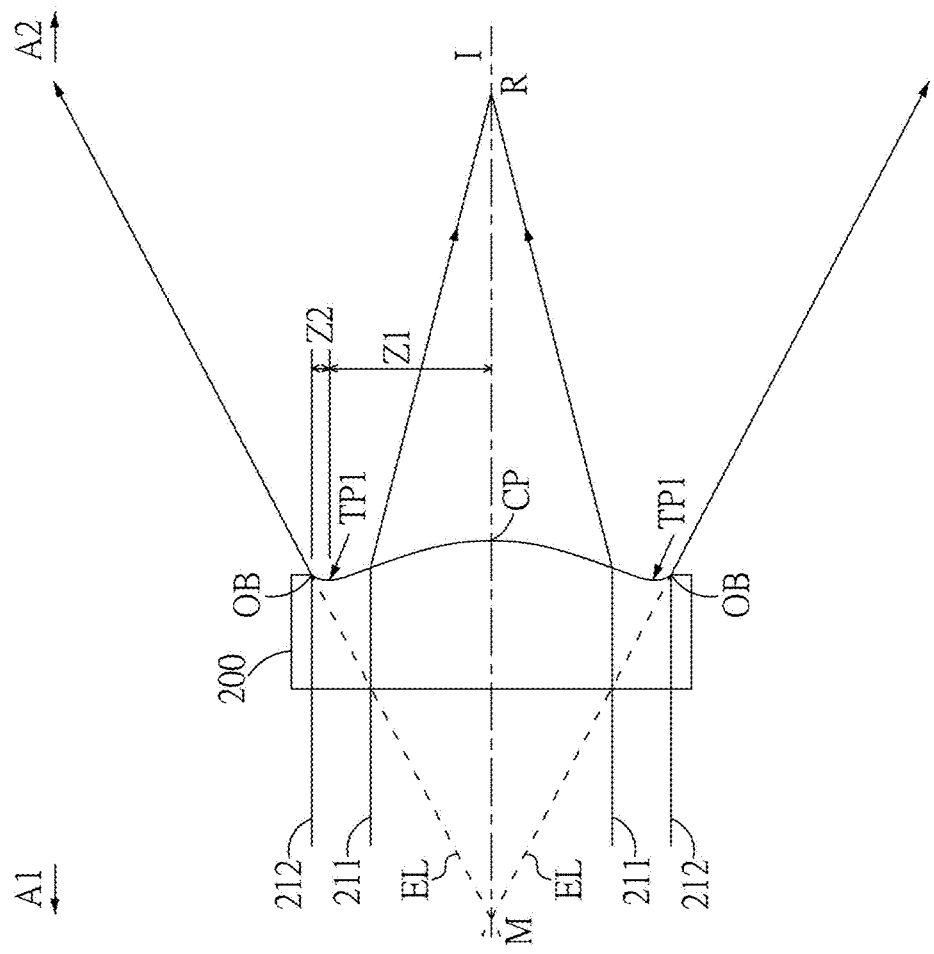
FIGS. 1-5 illustrates the methods for determining the surface shapes and for determining one region is the optical axis region or the periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
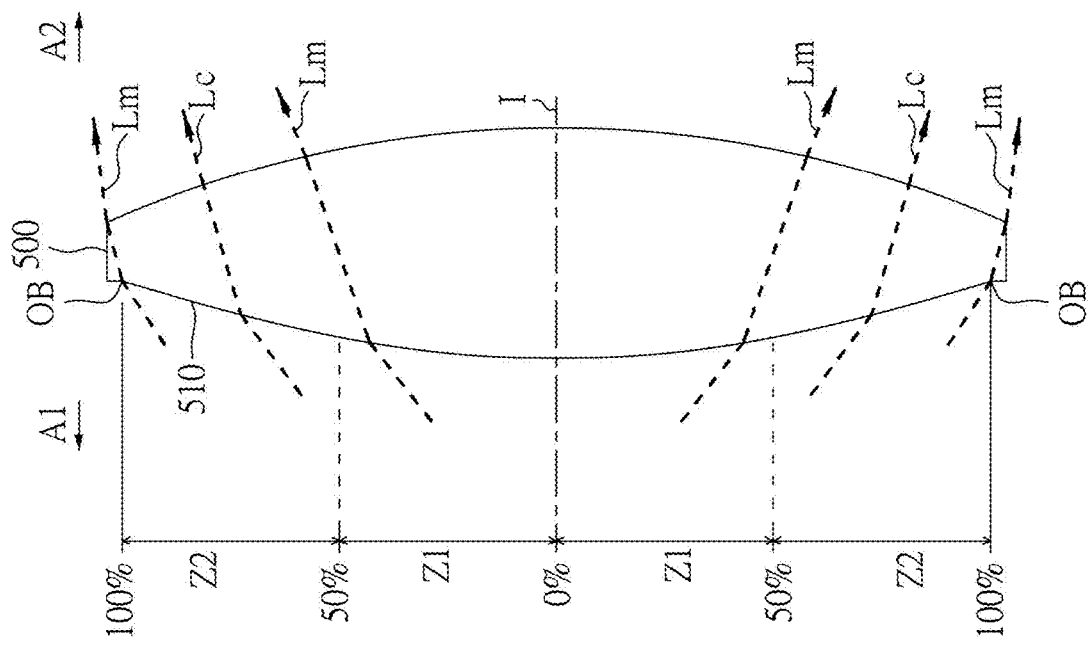
Figure 3:
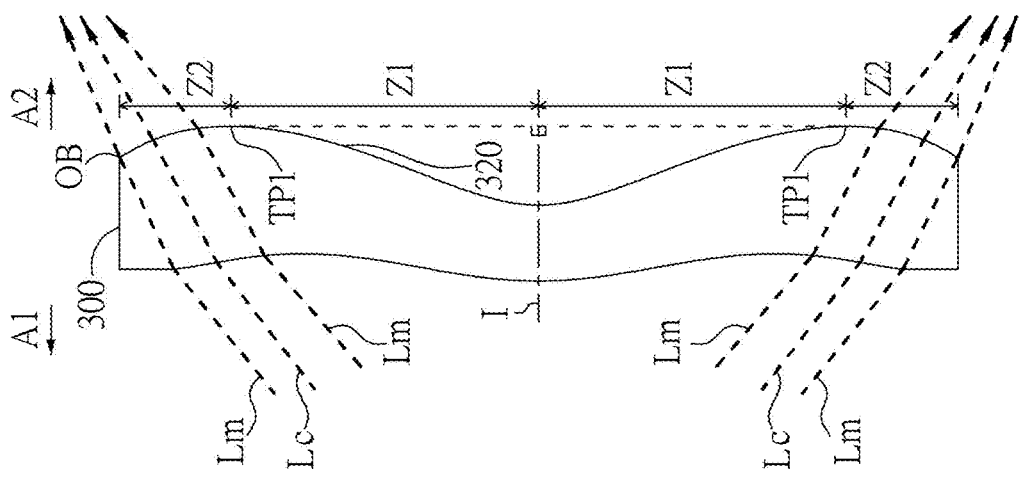

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R≥0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
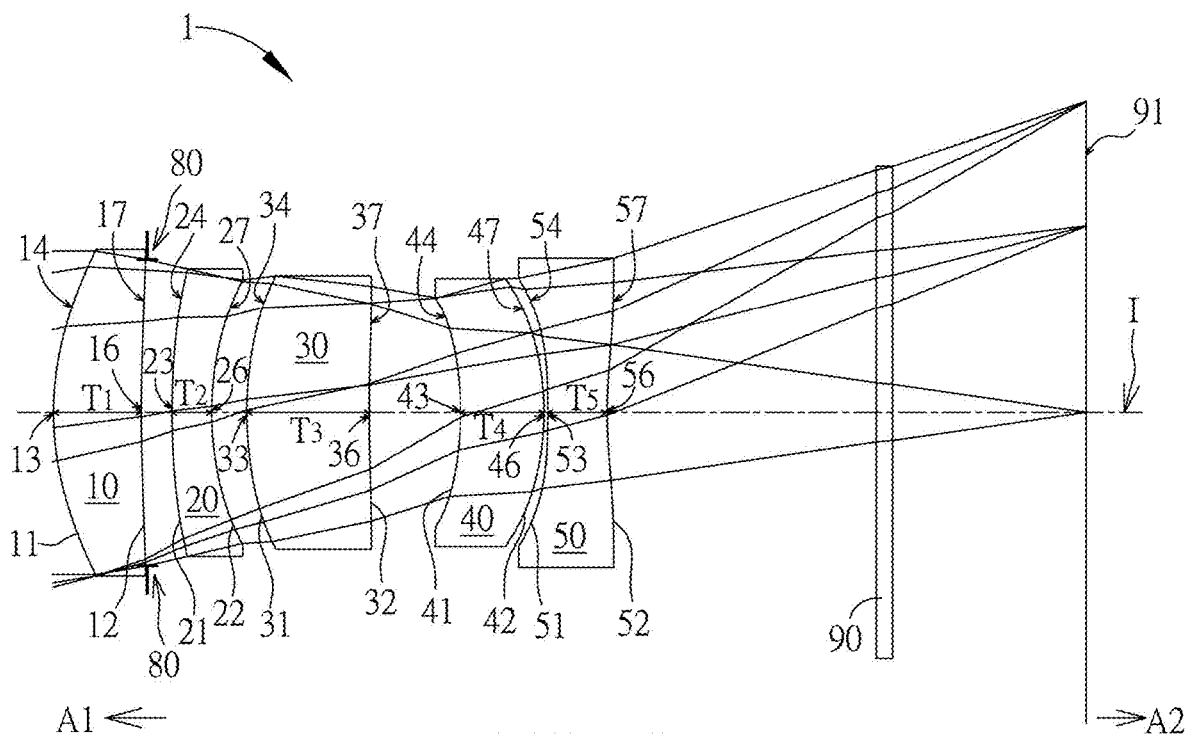
FIG. 6 illustrates a first embodiment of the optical imaging lens of the present invention.

As shown in FIG. 6, the optical imaging lens 1 of five lens elements of the present invention, sequentially located from an object side A1 (where an object is located) to an image side A2 along an optical axis I, has a first lens element 10, an aperture stop 80, a second lens element 20, a third lens element 30, a fourth lens element 40, a fifth lens element 50 and an image plane 91. Generally speaking, the first lens element 10, the second lens element 20, the third lens element 30, the fourth lens element 40 and the fifth lens element 50 may be made of a transparent plastic material but the present invention is not limited to this, and each lens element has an appropriate refracting power. In the present invention, lens elements having refracting power included by the optical imaging lens 1 are only the five lens elements (the first lens element 10, the second lens element 20, the third lens element 30, the fourth lens element 40 and the fifth lens element 50) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop 80 disposed in an appropriate position. In FIG. 6, the aperture stop 80 is disposed between the first lens element 10 and the second lens element 20. When imaging rays emitted or reflected by an object (not shown) which is located at the object side A1 enters the optical imaging lens 1 of the present invention, it forms a clear and sharp image on the image plane 91 at the image side A2 after passing through the first lens element 10, the aperture stop 80, the second lens element 20, the third lens element 30, the fourth lens element 40, the fifth lens element 50 and the filter 90. In one embodiment of the present invention, the filter 90 may be a filter of various suitable functions to filter out light of a specific wavelength, for example an infrared cut-off filter, and is placed between the fifth lens element 50 and the image plane 91.

The first lens element 10, the second lens element 20, the third lens element 30, the fourth lens element 40 and the fifth lens element 50 of the optical imaging lens 1 each has an object-side surface 11, 21, 31, 41 and 51 facing toward the object side A1 and allowing imaging rays to pass through as well as an image-side surface 12, 22, 32, 42 and 52 facing toward the image side A2 and allowing the imaging rays to pass through. Furthermore, each object-side surface and image-side surface of lens elements in the optical imaging lens 1 of present invention has an optical axis region and a periphery region.

Each lens element in the optical imaging lens 1 of the present invention further has a thickness T along the optical axis I. For embodiment, the first lens element 10 has a first lens element thickness T1, the second lens element 20 has a second lens element thickness T2, the third lens element 30 has a third lens element thickness T3, the fourth lens element 40 has a fourth lens element thickness T4 and the fifth lens element 50 has a fifth lens element thickness T5. Therefore, a sum of thicknesses of all the five lens elements in the optical imaging lens 1 along the optical axis I is ALT=T1+T2+T3+T4+T5.

In addition, between two adjacent lens elements in the optical imaging lens 1 of the present invention there may be an air gap along the optical axis I. In the embodiments, there is an air gap G12 between the first lens element 10 and the second lens element 20, an air gap G23 between the second lens element 20 and the third lens element 30, an air gap G34 between the third lens element 30 and the fourth lens element 40 and air gap G45 between the fourth lens element 40 and the fifth lens element 50. Therefore, a sum of four air gaps from the first lens element 10 to the fifth lens element 50 along the optical axis I is AAG=G12+G23+G34+G45.

In addition, D35 is a distance from the image-side surface 32 of the third lens element 30 to the image-side surface 52 of the fifth lens element 50 along the optical axis I; a distance from the object-side surface 11 of the first lens element 10 to the image plane 91 along the optical axis I is TTL, namely a system length of the optical imaging lens 1; an effective focal length of the optical imaging lens 1 is EFL; a distance from the object-side surface 11 of the first lens element 10 to the image-side surface 52 of the fifth lens element 50 along the optical axis I is TL. HFOV stands for the half field of view of the optical imaging lens 1. ImgH is an image height of the optical imaging lens 1. Fno is the f-number of the optical imaging lens 1.

An air gap between the image-side surface 52 of the fifth lens element 50 and the filter 90 along the optical axis I is G5F when the filter 90 is placed between the fifth lens element 50 and the image plane 91; a thickness of the filter 90 along the optical axis I is TF; an air gap between the filter 90 and the image plane 91 along the optical axis I is GFP; and a distance from the image-side surface 52 of the fifth lens element 50 to the image plane 91 along the optical axis I, namely the back focal length is BFL. Therefore, BFL=G5F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; an Abbe number of the first lens element 10 is υ1; an Abbe number of the second lens element 20 is υ2; an Abbe number of the third lens element 30 is υ3; an Abbe number of the fourth lens element 40 is υ4 and an Abbe number of the fifth lens element 50 is υ5.

First Embodiment

Figures 7A, 7B, 7C, 7D:
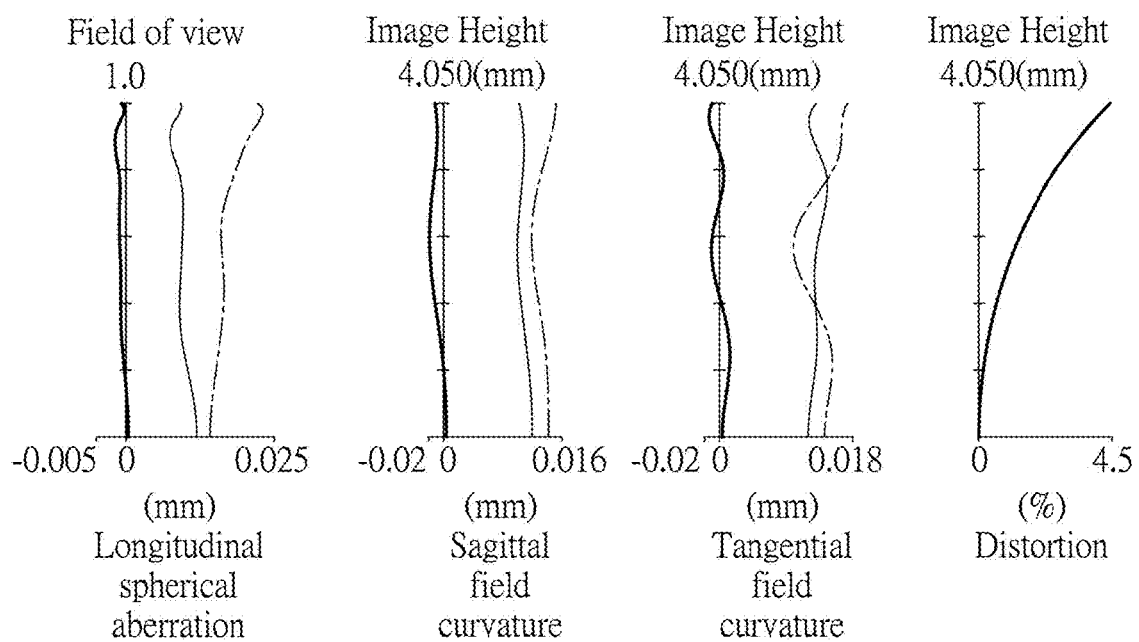
FIG. 7A illustrates the longitudinal spherical aberration on the image plane of the first embodiment.
FIG. 7B illustrates the field curvature aberration on the sagittal direction of the first embodiment.
FIG. 7C illustrates the field curvature aberration on the tangential direction of the first embodiment.
FIG. 7D illustrates the distortion aberration of the first embodiment.

Please refer to FIG. 6 which illustrates the first embodiment of the optical imaging lens 1 of the present invention. Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion aberration in each embodiment stands for the "image height" (ImgH), which is 4.050 mm.

The optical imaging lens 1 of the first embodiment is mainly composed of five lens elements with refracting power, an aperture stop 80, and an image plane 91. The aperture stop 80 is provided between the first lens element 10 and the second lens element 20.

The first lens element 10 has positive refracting power. An optical axis region 13 and a periphery region 14 of the object-side surface 11 of the first lens element 10 are convex. An optical axis region 16 and a periphery region 17 of the image-side surface 12 of the first lens element 10 are concave. Besides, both the object-side surface 11 and the image-side surface 12 of the first lens element 10 are aspherical surfaces, but it is not limited thereto.

The second lens element 20 has negative refracting power. An optical axis region 23 and a periphery region 24 of the object-side surface 21 of the second lens element 20 are convex. An optical axis region 26 and a periphery region 27 of the image-side surface 22 of the second lens element 20 are concave. Besides, both the object-side surface 21 and the image-side surface 22 of the second lens element 20 are aspherical surfaces, but it is not limited thereto.

The third lens element 30 has positive refracting power. An optical axis region 33 and a periphery region 34 of the object-side surface 31 of the third lens element 30 are convex. An optical axis region 36 of the image-side surface 32 of the third lens element 30 is concave and a periphery region 37 of the image-side surface 32 of the third lens element 30 is convex. Besides, both the object-side surface 31 and the image-side surface 32 of the third lens element 30 are aspherical surfaces, but it is not limited thereto.

The fourth lens element 40 has positive refracting power. An optical axis region 43 and a periphery region 44 of the object-side surface 41 of the fourth lens element 40 are concave. An optical axis region 46 and a periphery region 47 of the image-side surface 42 of the fourth lens element 40 are convex. Besides, both the object-side surface 41 and the image-side surface 42 of the fourth lens element 40 are aspherical surfaces, but it is not limited thereto.

The fifth lens element 50 has negative refracting power. An optical axis region 53 and a periphery region 54 of the object-side surface 51 of the fifth lens element 50 are concave. An optical axis region 56 and a periphery region 57 of the image-side surface 52 of the fifth lens element 50 are concave. Besides, both the object-side surface 51 and the image-side surface 52 of the fifth lens element 50 are aspherical surfaces, but it is not limited thereto.

In the optical imaging lens element 1 from the first lens element 10 to the fifth lens element 50 of the present invention, there are 10 surfaces, such as the object-side surfaces 11/21/31/41/51 and the image-side surfaces 12/22/32/42/52 are aspherical, but it is not limited thereto. If a surface is aspherical, these aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

In which:

Y represents a vertical distance from a point on the aspherical surface to the optical axis I;

Z represents the depth of an aspherical surface (the perpendicular distance between the point of the aspherical surface at a distance Y from the optical axis I and the tangent plane of the vertex on the optical axis I of the aspherical surface);

R represents the curvature radius of the lens element surface;

K is a conic constant; and $a_{2i}$ is the aspheric coefficient of the $2i^{th}$ order.

The optical data of the first embodiment of the optical imaging lens 1 are shown in FIG. 22 while the aspheric surface data are shown in FIG. 23. In the present embodiments of the optical imaging lens, the f-number of the entire optical imaging lens is Fno, EFL is the effective focal length, HFOV stands for the half field of view of the entire optical imaging lens, and the unit for the radius, the thickness and the focal length is in millimeters (mm). In this embodiment, EFL=14.741 mm; HFOV=14.740 degrees; TTL=13.428 mm; Fno=3.500; ImgH=4.050 mm.

Second Embodiment

Figure 8:
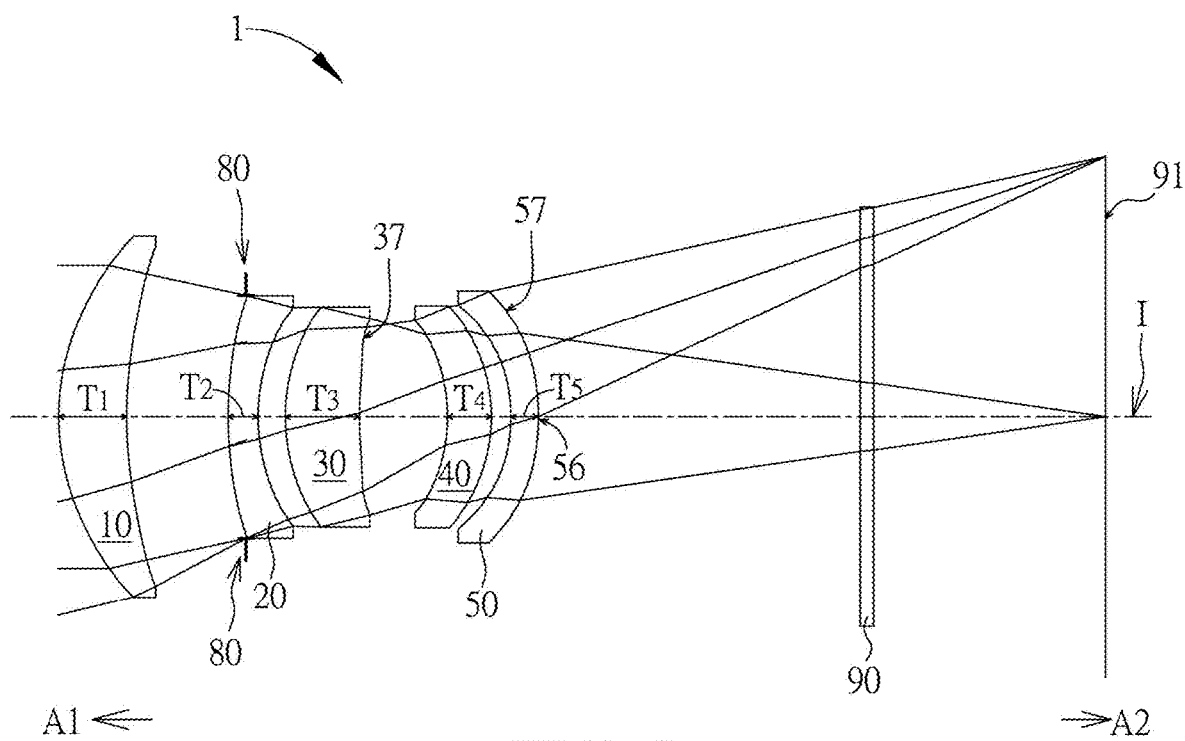
FIG. 8 illustrates a second embodiment of the optical imaging lens of the present invention.
Figures 9A, 9B, 9C, 9D:
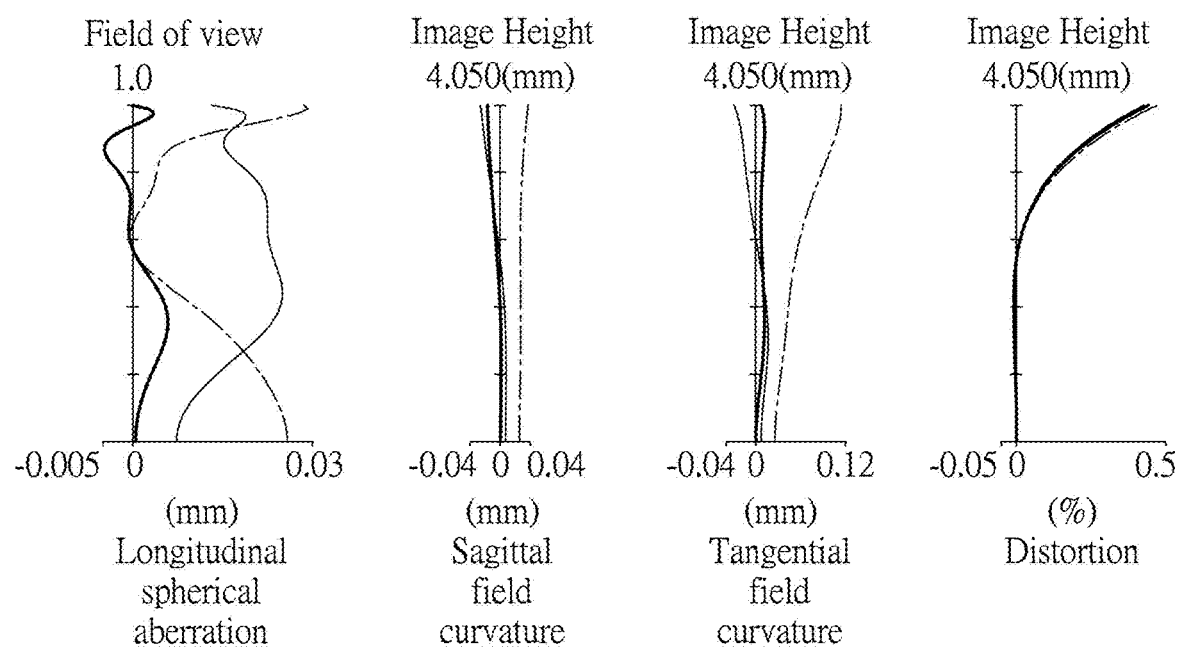
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion aberration of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as a convex surface or a concave surface, are omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 37 of the image-side surface 32 of the third lens element 30 is concave, an optical axis region 56 of the image-side surface 52 of the fifth lens element 50 is convex and a periphery region 57 of the image-side surface 52 of the fifth lens element 50 is convex.

The optical data of the second embodiment of the optical imaging lens are shown in FIG. 24 while the aspheric surface data are shown in FIG. 25. In this embodiment, EFL=16.543 mm; HFOV=13.699 degrees; TTL=16.266 mm; Fno=3.500; ImgH=4.050 mm. In particular, the distortion aberration of the optical imaging lens in this embodiment is better than that of the optical imaging lens in the first embodiment.

Third Embodiment

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 57 of the image-side surface 52 of the fifth lens element 50 is convex.

The optical data of the third embodiment of the optical imaging lens are shown in FIG. 26 while the aspheric surface data are shown in FIG. 27. In this embodiment, EFL=15.315 mm; HFOV=14.952 degrees; TTL=15.645 mm; Fno=3.500; ImgH=4.050 mm. In particular, the distortion aberration of the optical imaging lens in this embodiment is better than that of the optical imaging lens in the first embodiment.

Fourth Embodiment

Figure 12:
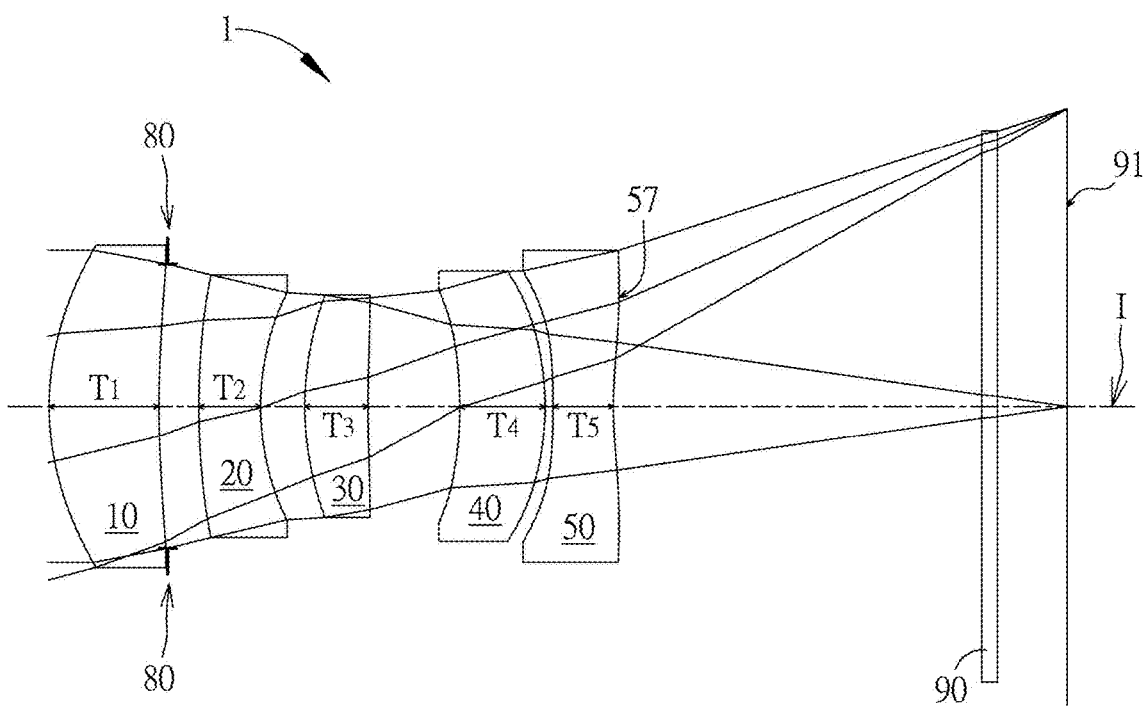
FIG. 12 illustrates a fourth embodiment of the optical imaging lens of the present invention.
Figures 13A, 13B, 13C, 13D:
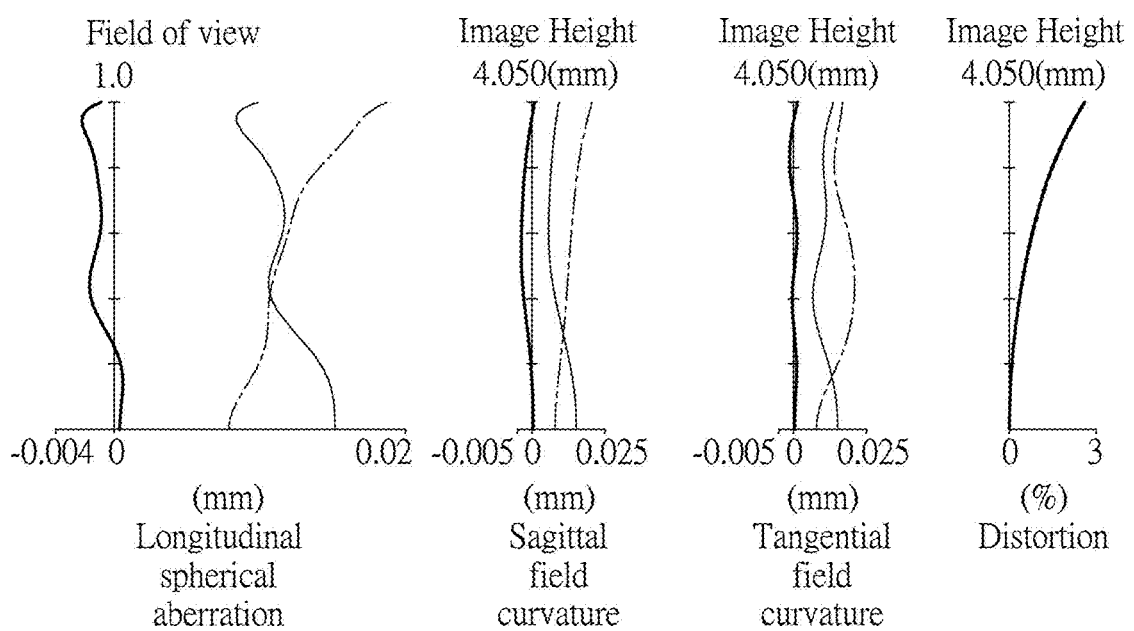
FIG. 13A illustrates the longitudinal spherical aberration on the image plane of the fourth embodiment.
FIG. 13B illustrates the field curvature aberration on the sagittal direction of the fourth embodiment.
FIG. 13C illustrates the field curvature aberration on the tangential direction of the fourth embodiment.
FIG. 13D illustrates the distortion aberration of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 57 of the image-side surface 52 of the fifth lens element 50 is convex.

The optical data of the fourth embodiment of the optical imaging lens are shown in FIG. 28 while the aspheric surface data are shown in FIG. 29. In this embodiment, EFL=14.871 mm; HFOV=14.867 degrees; TTL=13.825 mm; Fno=3.500; ImgH=4.050 mm. In particular, 1) the longitudinal spherical aberration of the optical imaging lens in this embodiment is better than that of the optical imaging lens in the first embodiment, and 2) the distortion aberration of the optical imaging lens in this embodiment is better than that of the optical imaging lens in the first embodiment.

Fifth Embodiment

Figure 14:
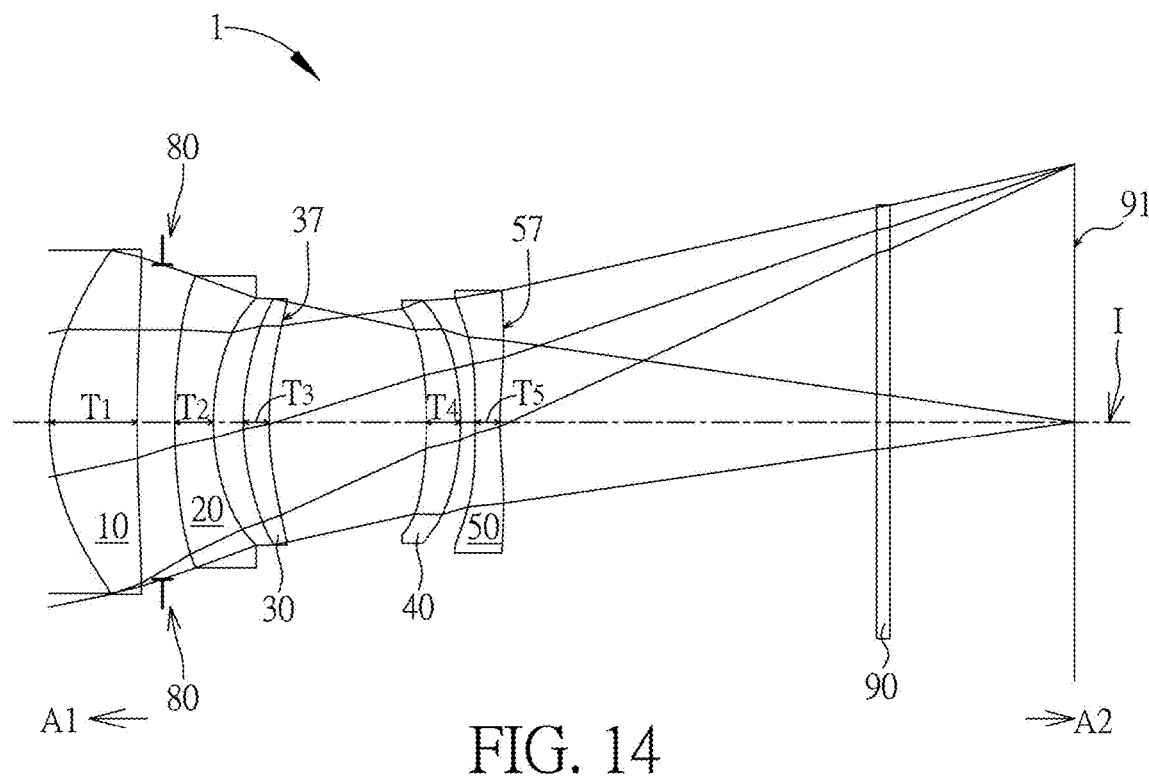
FIG. 14 illustrates a fifth embodiment of the optical imaging lens of the present invention.
Figures 15A, 15B, 15C, 15D:
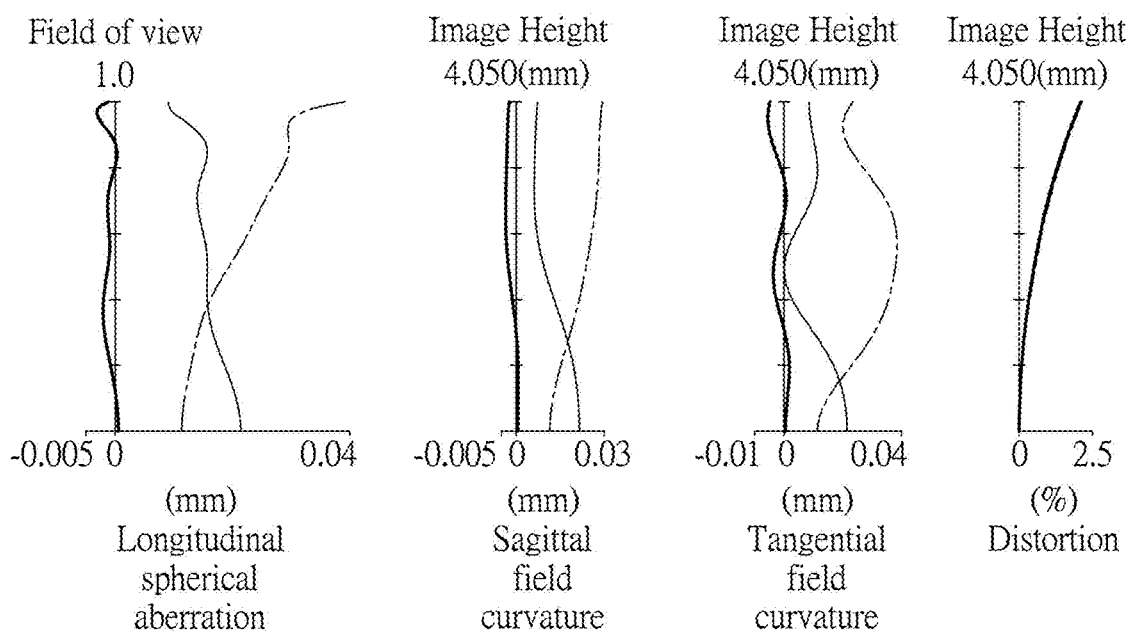
FIG. 15A illustrates the longitudinal spherical aberration on the image plane of the fifth embodiment.
FIG. 15B illustrates the field curvature aberration on the sagittal direction of the fifth embodiment.
FIG. 15C illustrates the field curvature aberration on the tangential direction of the fifth embodiment.
FIG. 15D illustrates the distortion aberration of the fifth embodiment.

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 37 of the image-side surface 32 of the third lens element 30 is concave, and a periphery region 57 of the image-side surface 52 of the fifth lens element 50 is convex.

The optical data of the fifth embodiment of the optical imaging lens are shown in FIG. 30 while the aspheric surface data are shown in FIG. 31. In this embodiment, EFL=18.886 mm; HFOV=11.860 degrees; TTL=16.097 mm; Fno=3.500; ImgH=4.050 mm. In particular, the distortion aberration of the optical imaging lens in this embodiment is better than that of the optical imaging lens in the first embodiment.

Sixth Embodiment

Figure 16:
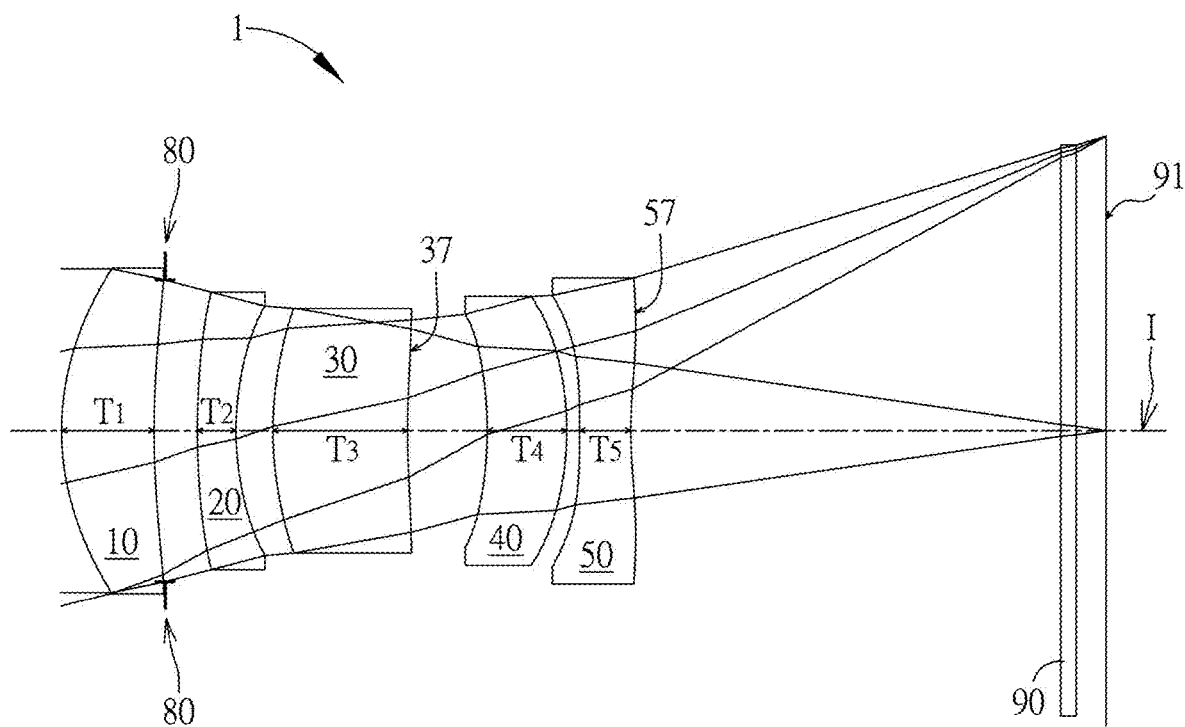
FIG. 16 illustrates a sixth embodiment of the optical imaging lens of the present invention.
Figures 17A, 17B, 17C, 17D:
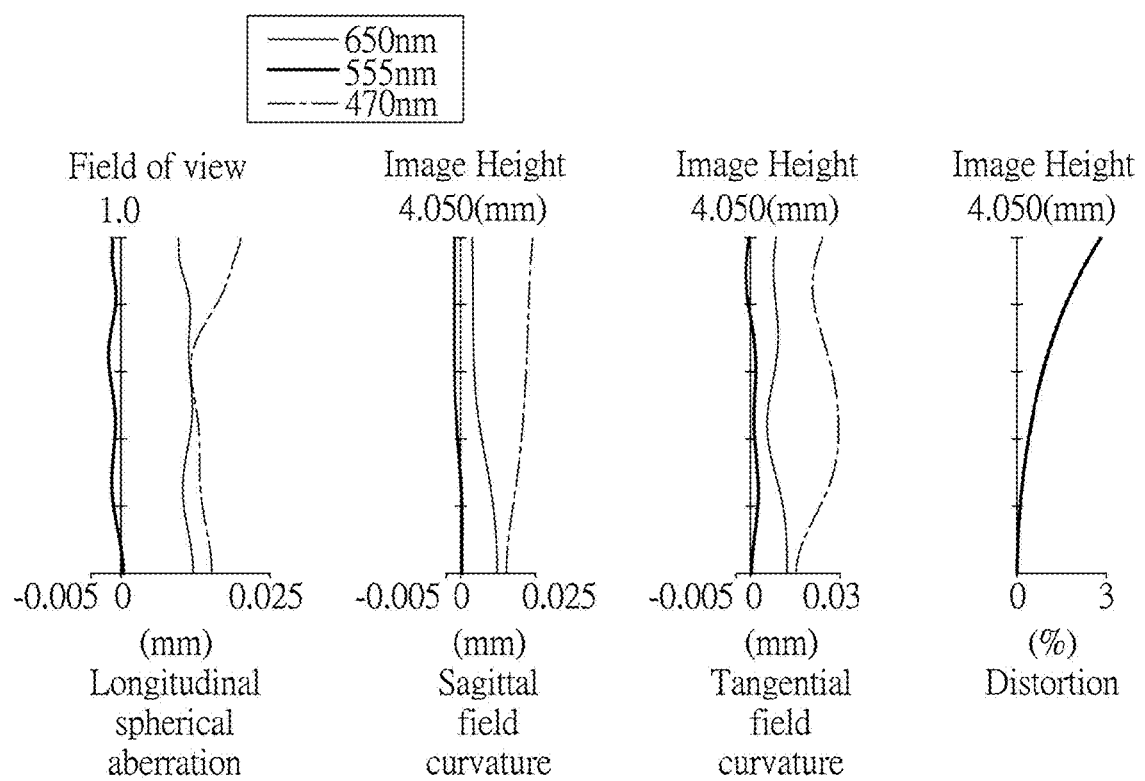
FIG. 17A illustrates the longitudinal spherical aberration on the image plane of the sixth embodiment.
FIG. 17B illustrates the field curvature aberration on the sagittal direction of the sixth embodiment.
FIG. 17C illustrates the field curvature aberration on the tangential direction of the sixth embodiment.
FIG. 17D illustrates the distortion aberration of the sixth embodiment.

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 37 of the image-side surface 32 of the third lens element 30 is concave, and a periphery region 57 of the image-side surface 52 of the fifth lens element 50 is convex.

The optical data of the sixth embodiment of the optical imaging lens are shown in FIG. 32 while the aspheric surface data are shown in FIG. 33. In this embodiment, EFL=15.602 mm; HFOV=14.170 degrees; TTL=14.350 mm; Fno=3.500; ImgH=4.050 mm. In particular, the distortion aberration of the optical imaging lens in this embodiment is better than that of the optical imaging lens in the first embodiment.

Seventh Embodiment

Figure 18:
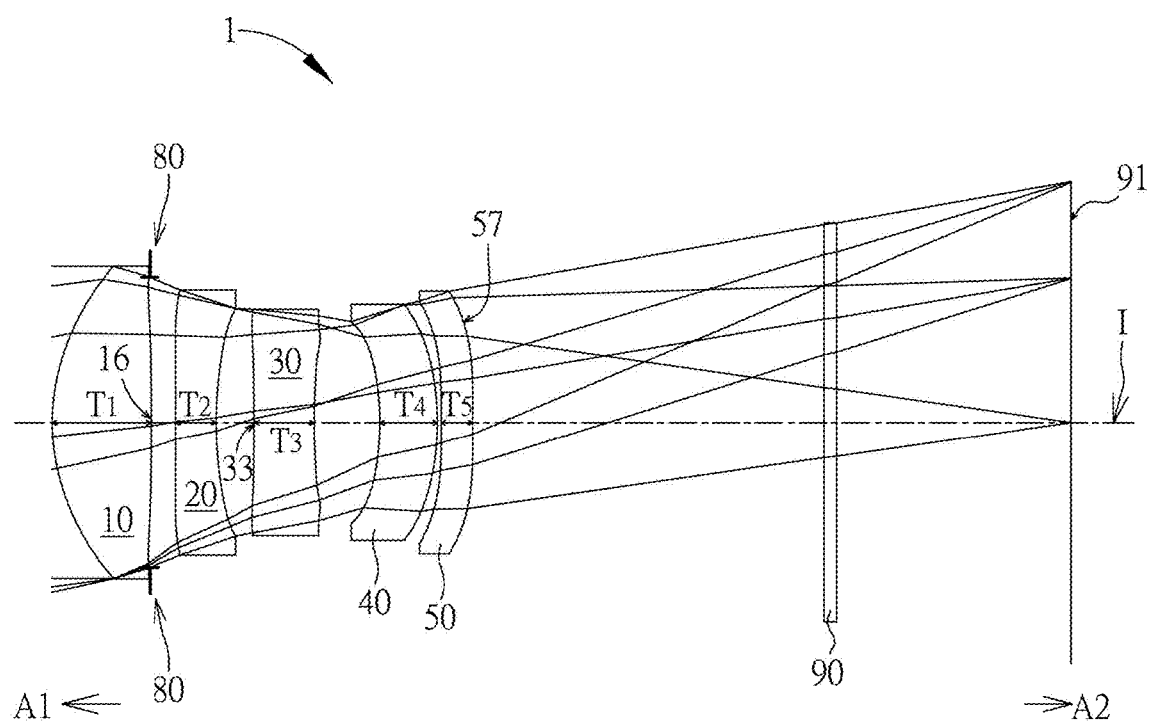
FIG. 18 illustrates a seventh embodiment of the optical imaging lens of the present invention.
Figures 19A, 19B, 19C, 19D:
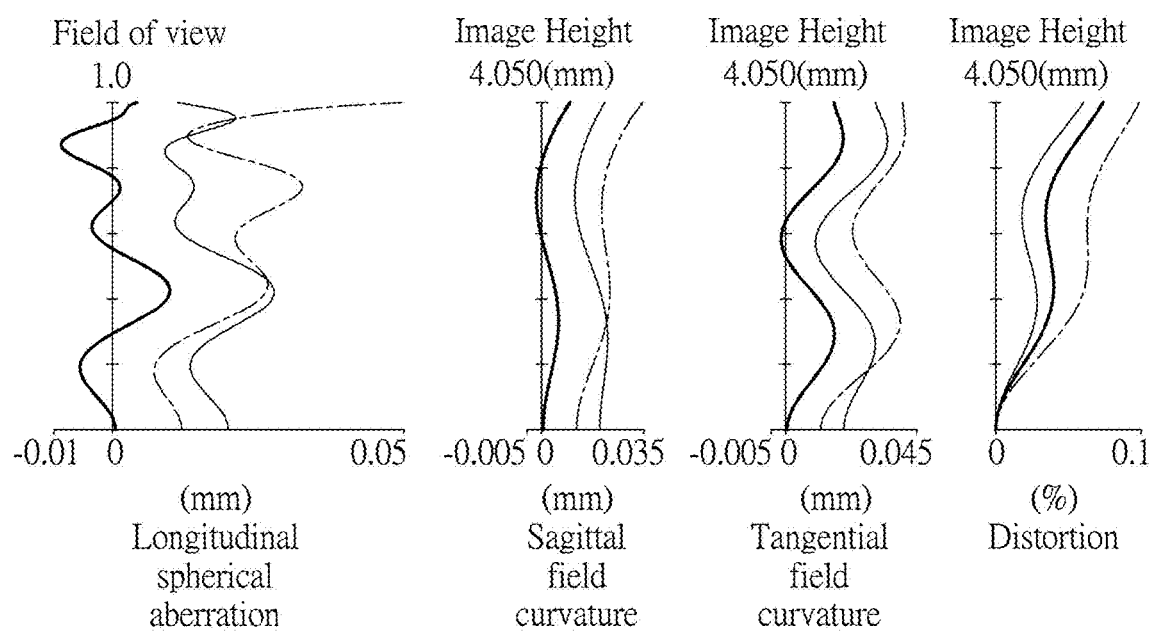
FIG. 19A illustrates the longitudinal spherical aberration on the image plane of the seventh embodiment.
FIG. 19B illustrates the field curvature aberration on the sagittal direction of the seventh embodiment.
FIG. 19C illustrates the field curvature aberration on the tangential direction of the seventh embodiment.
FIG. 19D illustrates the distortion aberration of the seventh embodiment.

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, an optical axis region 16 of the image-side surface 12 of the first lens element 10 is convex, the third lens element 30 has negative refracting power, an optical axis region 33 of the object-side surface 31 of the third lens element 30 is concave and a periphery region 57 of the image-side surface 52 of the fifth lens element 50 is convex.

The optical data of the seventh embodiment of the optical imaging lens are shown in FIG. 34 while the aspheric surface data are shown in FIG. 35. In this embodiment, EFL=18.403 mm; HFOV=12.403 degrees; TTL=17.134 mm; Fno=3.500; ImgH=4.050 mm. In particular, the distortion aberration of the optical imaging lens in this embodiment is better than that of the optical imaging lens in the first embodiment.

Eighth Embodiment

Figure 20:
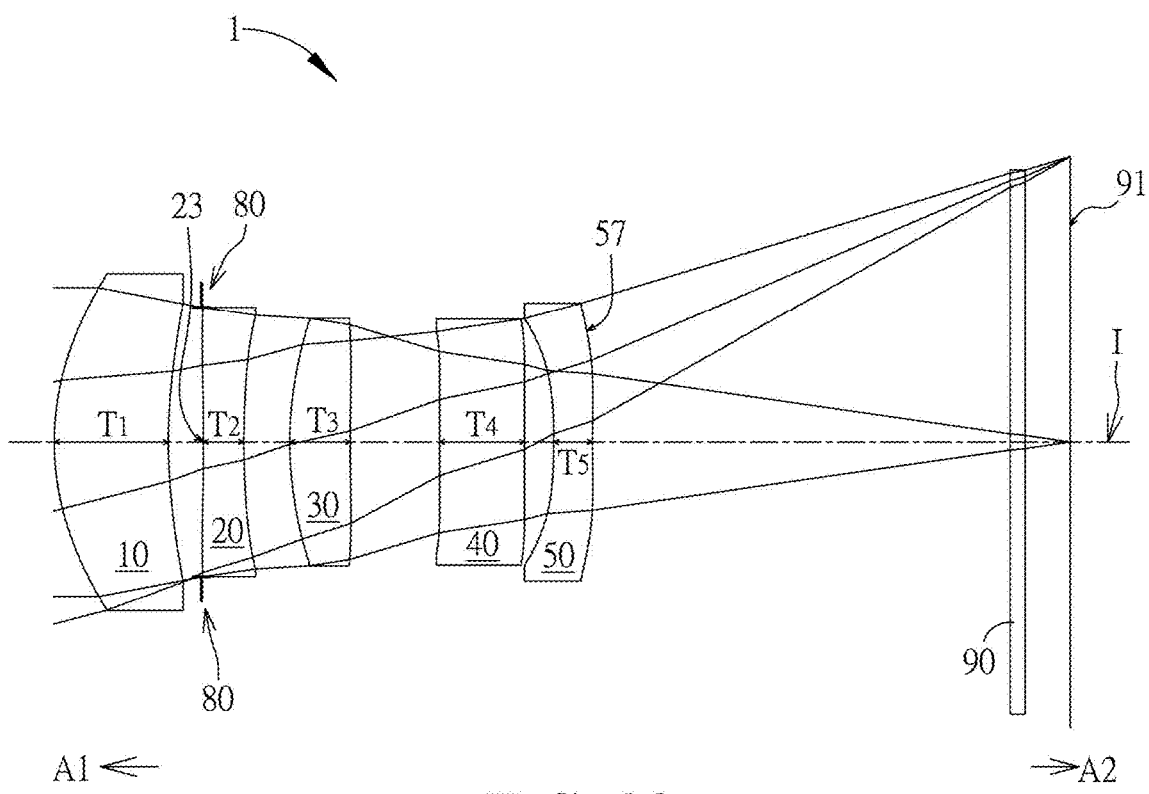
FIG. 20 illustrates an eighth embodiment of the optical imaging lens of the present invention.
Figures 21A, 21B, 21C, 21D:
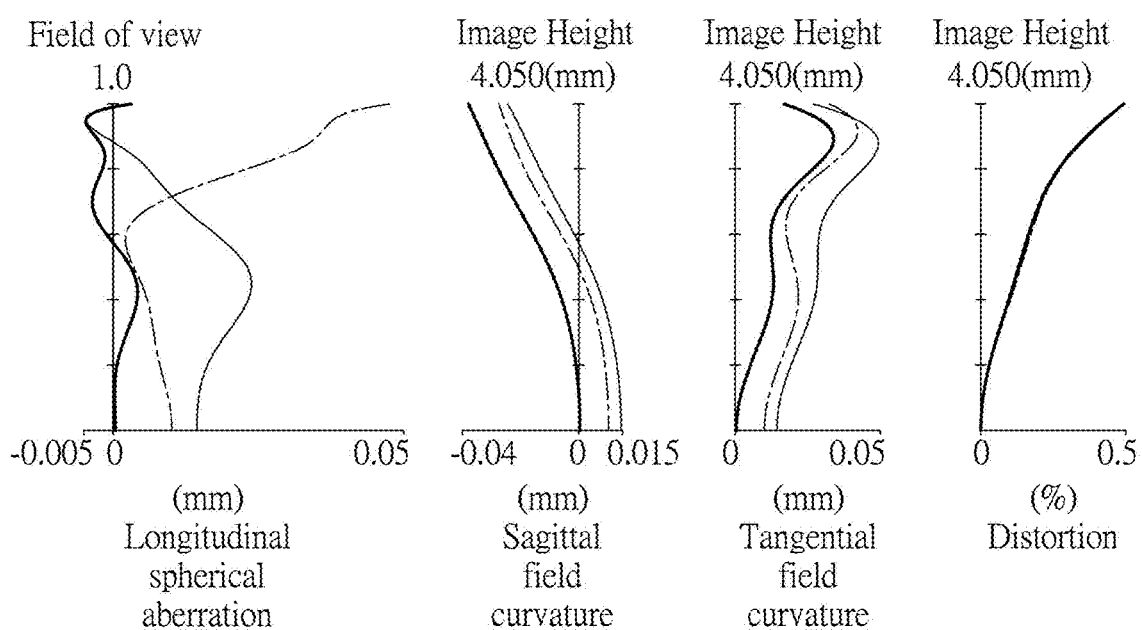
FIG. 21A illustrates the longitudinal spherical aberration on the image plane of the eighth embodiment.
FIG. 21B illustrates the field curvature aberration on the sagittal direction of the eighth embodiment.
FIG. 21C illustrates the field curvature aberration on the tangential direction of the eighth embodiment.
FIG. 21D illustrates the distortion aberration of the eighth embodiment.

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, an optical axis region 23 of the object-side surface 21 of the second lens element 20 is concave, the fourth lens element 40 has negative refracting power and a periphery region 57 of the image-side surface 52 of the fifth lens element 50 is convex.

The optical data of the eighth embodiment of the optical imaging lens are shown in FIG. 36 while the aspheric surface data are shown in FIG. 37. In this embodiment, EFL=15.329 mm; HFOV=14.733 degrees; TTL=14.389 mm; Fno=3.500; ImgH=4.050 mm. In particular, the distortion aberration of the optical imaging lens in this embodiment is better than that of the optical imaging lens in the first embodiment.

Some important ratios in each embodiment are shown in FIG. 38 and in FIG. 39.

Each embodiment of the present invention provides an optical imaging lens which has an enhanced telephoto function and good imaging quality. For example, satisfying the design of the following lens surface shape or refracting power configuration may effectively optimize the imaging quality of the optical imaging lens. Furthermore, the present invention has the corresponding advantages:

1. (a) a periphery region of the image-side surface of the first lens element is concave, a periphery region of the object-side surface of the second lens element is convex, and an optical axis region of the object-side surface of the fifth lens element is concave may go with:

(b) the first lens element has positive refracting power, a periphery region of the object-side surface of the third lens element is convex and the fifth lens element has negative refracting power;

(c) the second lens element has negative refracting power and a periphery region of the object-side surface of the third lens element is convex;

(d) an optical axis region of the image-side surface of the third lens element is concave and the fifth lens element has negative refracting power.

1) When (a) goes with either one configuration of (b) and (c) may satisfy the objects of the correction of the spherical aberration, of the aberration, and of the reduction of the distortion aberration of the optical imaging lens. Further the satisfaction of EFL*Fno/HFOV≥3.500 mm/degree may effectively enhance the telephoto function. The preferable range is 3.500 mm/degree≤EFL*Fno/HFOV≤5.700 mm/degree. Further satisfaction of (G12+G23+G34)/(G45+T5) ≥2.500 may effectively reduce the system length of the optical imaging lens. The preferable range is 2.500≤(G12+G23+G34)/(G45+T5)≤5.900.

2) When (a) goes with (d), the design may also satisfy the objects of the correction of the spherical aberration, of the aberration, and of the reduction of the distortion aberration of the optical imaging lens. The satisfaction of EFL/AAG≥4.500 and the largest air gap along the optical axis being G12 or G34 may effectively enhance the telephoto function. The preferable range is 4.500≤EFL/AAG≤8.500.

2. A design of a reflecting element, for example placed between the object side A1 and the first lens element 10, may go with the embodiments of the present invention to make the light path bend so as to help reduce the size of the optical imaging lens 1 to meet the requirement of miniature of a portable electronic device.

3. In order to reduce the system length of the optical imaging lens 1 along the optical axis I and simultaneously to ensure the imaging quality, the air gaps between the adjacent lens elements or the thickness of each lens element should be appropriately adjusted. However, the assembly or the manufacturing difficulty should be taken into consideration as well. If the following numerical conditions are selectively satisfied, the optical imaging lens 1 of the present invention may have better optical arrangements:

1) (T5+BFL)/T1≥4.300, and the preferable range is 4.300≤ (T5+BFL)/T1≤8.800;

2) (T3+G34+T4)/T2≥3.900, and the preferable range is 3.900≤(T3+G34+T4)/T2≤7.700;

3) G34/(T2+G23)≤2.300, and the preferable range is 0.700≤G34/(T2+G23)≤2.300;

4) T1/(T4+G45)≥1.000, and the preferable range is 1.000≤T1/(T4+G45)≤2.000

5) ALT/(G12+G34)≤3.200, and the preferable range is 1.000≤ALT/(G12+G34)≤3.200;

6) BFL/AAG≥2.400, and the preferable range is 2.400≤BFL/AAG≤4.600;

7) EFL/TL≥1.800, and the preferable range is 1.800≤EFL/TL≤2.800;

8) TTL/HFOV≥0.900 mm/degree, and the preferable range is 0.900 mm/degree≤TTL/HFOV≤1.500 mm/degree;

9) (T2+G45)/G12≤2.000, and the preferable range is 0.400≤(T2+G45)/G12≤2.000;

10) (T2+T3+T4)/T5≤5.400, and the preferable range is 3.300≤(T2+T3+T4)/T5≤5.400;

11) ALT/(T1+G34)≤2.300, and the preferable range is 0.800≤ALT/(T1+G34)≤2.300;

12) D35/T2≤6.000, and the preferable range is 3.800≤D35/T2≤6.000;

13) (EFL+G45)/ALT≥2.900, and the preferable range is 2.900≤(EFL+G45)/ALT≤5.800;

14) (T3+G34)/G23≤6.100, and the preferable range is 3.100≤(T3+G34)/G23≤6.100;

15) (T4+T5)/T3≤2.300, and the preferable range is 0.800≤(T4+T5)/T3≤2.300;

16) T1/G23≥2.500, and the preferable range is 2.500≤T1/G23≤3.300;

17) AAG/(G12+G45)≤4.600, and the preferable range is 1.800≤AAG/(G12+G45)≤4.600.

Any arbitrary combination of the parameters of the embodiments can be selected to increase the lens limitation so as to facilitate the design of the same structure of the present invention.

In the light of the unpredictability of the optical imaging lens, the above conditional formulas preferably suggest the above principles to have a shorter system length of the optical imaging lens, an enhanced telephoto function, good optical performance, better imaging quality or a better fabrication yield to overcome the drawbacks of prior art.

One or more above-mentioned limiting conditional formulae may be arbitrarily combined in the examples of the present invention, but the present invention is not limited to this. In the implementation of the present invention, detailed structures such as a convex or a concave surface arrangement of one or more lens elements may be additionally designed to enhance the control of system performance and/or resolution in addition to the aforementioned conditional formulae. It should be noted that these details may be selectively combined and applied to other examples of the present invention without conflict.

The numeral value ranges within the maximum and minimum values obtained from the combination ratio relationships of the optical parameters disclosed in each embodiment of the invention can all be implemented accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, and a fifth lens element, each lens element having an object-side surface facing toward the object side and allowing imaging rays to pass through as well as an image-side surface facing toward the image side and allowing the imaging rays to pass through, the optical imaging lens comprising:

the first lens element has positive refracting power and a periphery region of the image-side surface of the first lens element is concave;

an optical axis region of the object-side surface of the second lens element is convex and a periphery region of the object-side surface of the second lens element is convex;

a periphery region of the object-side surface of the third lens element is convex; and the fifth lens element has negative refracting power and an optical axis region of the object-side surface of the fifth lens element is concave;

lens elements of the optical imaging lens are only the above-mentioned five lens elements;

EFL is an effective focal length of the optical imaging lens, Fno is the f-number of the optical imaging lens, HFOV stands for the half field of view of the optical imaging lens, T5 is a thickness of the fifth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis and G45 is an air gap between the fourth lens element and the fifth lens element along the optical axis, and the optical imaging lens satisfies the relationship: EFL*Fno/HFOV≥3.500 mm/degree and (G12+G23+G34)/(G45+T5)≥2.500.

2. The optical imaging lens of claim 1, wherein TTL is a distance from the object-side surface of the first lens element to an image plane along the optical axis, and the optical imaging lens satisfies the relationship: TTL/HFOV≥0.900 mm/degree.

3. The optical imaging lens of claim 1, wherein BFL is a distance from the image-side surface of the fifth lens element to an image plane along the optical axis and T1 is a thickness of the first lens element along the optical axis, and the optical imaging lens satisfies the relationship: (T5+BFL)/T1≥4.300.

4. The optical imaging lens of claim 1, wherein T2 is a thickness of the second lens element along the optical axis, and the optical imaging lens satisfies the relationship: G34/(T2+G23)≤2.300.

5. The optical imaging lens of claim 1, wherein T1 is a thickness of the first lens element along the optical axis and T4 is a thickness of the fourth lens element along the optical axis, and the optical imaging lens satisfies the relationship: T1/(T4+G45)≥1.000.

6. The optical imaging lens of claim 1, wherein T2 is a thickness of the second lens element along the optical axis, and the optical imaging lens satisfies the relationship: (T2+G45)/G12≤2.000.

7. The optical imaging lens of claim 1, wherein T2 is a thickness of the second lens element along the optical axis, T3 is a thickness of the third lens element along the optical axis and T4 is a thickness of the fourth lens element along the optical axis, and the optical imaging lens satisfies the relationship: (T2+T3+T4)/T5≤5.400.

8. An optical imaging lens, from an object side to an image side in order along an optical axis comprising: a first lens element, a second lens element, a third lens element, a fourth lens element, and a fifth lens element, each lens element having an object-side surface facing toward the object side and allowing imaging rays to pass through as well as an image-side surface facing toward the image side and allowing the imaging rays to pass through, the optical imaging lens comprising:

a periphery region of the image-side surface of the first lens element is concave;

the second lens element has negative refracting power, an optical axis region of the object-side surface of the second lens elements is convex and a periphery region of the object-side surface of the second lens element is convex;

a periphery region of the object-side surface of the third lens element is convex; and an optical axis region of the object-side surface of the fifth lens element is concave;

lens elements of the optical imaging lens are only the above-mentioned five lens elements;

EFL is an effective focal length of the optical imaging lens, Fno is the f-number of the optical imaging lens, HFOV stands for the half field of view of the optical imaging lens, T5 is a thickness of the fifth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis and G45 is an air gap between the fourth lens element and the fifth lens element along the optical axis, and the optical imaging lens satisfies the relationship: EFL*Fno/HFOV≥3.500 mm/degree and (G12+G23+G34)/(G45+T5)≥2.500.

9. The optical imaging lens of claim 8, wherein ALT is a sum of thicknesses of all the five lens elements along the optical axis, and the optical imaging lens satisfies the relationship: (EFL+G45)/ALT≥2.900.

10. The optical imaging lens of claim 8, wherein T3 is a thickness of the third lens element along the optical axis, and the optical imaging lens satisfies the relationship: (T3+G34)/G23≤6.100.

11. The optical imaging lens of claim 8, wherein T3 is a thickness of the third lens element along the optical axis and T4 is a thickness of the fourth lens element along the optical axis, and the optical imaging lens satisfies the relationship: (T4+T5)/T3≤2.300.

12. The optical imaging lens of claim 8, wherein T1 is a thickness of the first lens element along the optical axis, and the optical imaging lens satisfies the relationship: T1/G23≥2.500.

13. The optical imaging lens of claim 8, wherein BFL is a distance from the image-side surface of the fifth lens element to an image plane along the optical axis and AAG is a sum of four air gaps from the first lens element to the fifth lens element along the optical axis, and the optical imaging lens satisfies the relationship: BFL/AAG≥2.400.

14. The optical imaging lens of claim 8, wherein AAG is a sum of four air gaps from the first lens element to the fifth lens element along the optical axis, and the optical imaging lens satisfies the relationship: AAG/(G12+G45)≤4.600.

15. An optical imaging lens, from an object side to an image side in order along an optical axis comprising: a first lens element, a second lens element, a third lens element, a fourth lens element, and a fifth lens element, each lens element having an object-side surface facing toward the object side and allowing imaging rays to pass through as well as an image-side surface facing toward the image side and allowing the imaging rays to pass through, the optical imaging lens comprising:

a periphery region of the image-side surface of the first lens element is concave;

a periphery region of the object-side surface of the second lens element is convex;

an optical axis region of the image-side surface of the third lens element is concave; and the fifth lens element has negative refracting power and an optical axis region of the object-side surface of the fifth lens element is concave;

lens elements of the optical imaging lens are only the above-mentioned five lens elements;

EFL is an effective focal length of the optical imaging lens, AAG is a sum of four air gaps from the first lens element to the fifth lens element along the optical axis, G12 is an air gap between the first lens element and the second lens element along the optical axis and G34 is an air gap between the third lens element and the fourth lens element along the optical axis, and the optical imaging lens satisfies the relationship: EFL/AAG≥4.500 and the largest air gap along the optical axis is G12 or G34.

16. The optical imaging lens of claim 15, wherein T2 is a thickness of the second lens element along the optical axis, T3 is a thickness of the third lens element along the optical axis and T4 is a thickness of the fourth lens element along the optical axis, and the optical imaging lens satisfies the relationship: (T3+G34+T4)/T2≥3.900.

17. The optical imaging lens of claim 15, wherein ALT is a sum of thicknesses of all the five lens elements along the optical axis, and the optical imaging lens satisfies the relationship: ALT/(G12+G34)≤3.200.

18. The optical imaging lens of claim 15, wherein TL is a distance from the object-side surface of the first lens element to the image-side surface of the fifth lens element along the optical axis, and the optical imaging lens satisfies the relationship: EFL/TL≥1.800.

19. The optical imaging lens of claim 15, wherein ALT is a sum of thicknesses of all the five lens elements along the optical axis and T1 is a thickness of the first lens element along the optical axis, and the optical imaging lens satisfies the relationship: ALT/(T1+G34)≤2.300.

20. The optical imaging lens of claim 15, wherein T2 is a thickness of the second lens element along the optical axis and D35 is a distance from the image-side surface of the third lens element to the image-side surface of the fifth lens element along the optical axis, and the optical imaging lens satisfies the relationship: D35/T2≤6.000.

* * * * *